(12) United States Patent
Barsotti et al.

(10) Patent No.: US 8,154,811 B2
(45) Date of Patent: Apr. 10, 2012

(54) MEASURING READER/WRITER OFFSET IN A TAPE DRIVE HEAD

(75) Inventors: Matt Barsotti, Santa Maria, CA (US); Turguy Goker, Solana Beach, CA (US); Carl Hoerger, Boise, ID (US); Jeff McAllister, Boise, ID (US); Ming-Chih Weng, Los Angeles, CA (US)

(73) Assignees: Quantum Corporation, San Jose, CA (US); Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 12/414,491

(22) Filed: Mar. 30, 2009

(65) Prior Publication Data
US 2010/0246043 A1    Sep. 30, 2010

(51) Int. Cl.
*G11B 27/36*    (2006.01)
(52) U.S. Cl. ............................................. 360/31; 360/60
(58) Field of Classification Search .................. None
See application file for complete search history.

(56) References Cited

U.S. PATENT DOCUMENTS

| | | | |
|---|---|---|---|
| 6,906,888 B1 * | 6/2005 | Trabert et al. | 360/77.13 |
| 6,940,681 B2 | 9/2005 | Bellesis et al. | |
| 7,660,069 B2 * | 2/2010 | Trabert et al. | 360/77.13 |

* cited by examiner

*Primary Examiner* — Jason Olson
(74) *Attorney, Agent, or Firm* — Baker Botts L.L.P.

(57) ABSTRACT

In a method of electronically measuring reader/writer offset in a tape drive head, a plurality of sequentially adjacent data tracks are written on a tape with a write head. Error rate information is measured while reading a data track of the plurality of sequentially adjacent data tracks with a read head of the tape drive. A bathtub shaped curve is built from a set of the error rate information which is accumulated by reading the data track at a plurality of offsets of the read head relative to the data track. Offset of the read head relative to the write head is measured by determining an offset of the read head which correlates to a magnetic center of the data track as represented by a center point between edges of the bathtub shaped curve.

28 Claims, 17 Drawing Sheets

500

CONDITION A TAPE FOR USE.
510

WRITE A PLURALITY OF SEQUENTIALLY ADJACENT DATA TRACKS ON THE TAPE WITH A WRITE HEAD OF A TAPE DRIVE.
520

MEASURE ERROR RATE INFORMATION WHILE READING A DATA TRACK OF THE PLURALITY OF SEQUENTIALLY ADJACENT DATA TRACKS WITH A READ HEAD OF THE TAPE DRIVE.
530

BUILD A BATHTUB SHAPED CURVE FROM A SET OF THE ERROR RATE INFORMATION ACCUMULATED BY READING THE DATA TRACK AT A PLURALITY OF OFFSETS OF THE READ HEAD RELATIVE TO THE DATA TRACK.
540

MEASURE OFFSET OF THE READ HEAD RELATIVE TO THE WRITE HEAD BY DETERMINING AN OFFSET OF THE READ HEAD WHICH CORRELATES TO A MAGNETIC CENTER OF THE DATA TRACK AS REPRESENTED BY A CENTER POINT BETWEEN EDGES OF THE BATHTUB SHAPED CURVE.
550

MEASURING READER/WRITER OFFSET IN A TAPE DRIVE HEAD

BACKGROUND

Data loss is a serious threat to companies of all sizes, and catastrophic data loss can destroy a business, however, most data loss is not the result of a big disaster, it is caused by human error, viruses, and disk malfunctions. A suitable backup routine provides the best protection against data loss of all kinds, and tape technology remains the most efficient and cost-effective means to perform system backup, whether for a small business or global operations.

The tape/tape drive industry has become fragmented with the proliferation of formats and technologies that have overly complicated customer buying decisions. The Liner Tape-Open (LTO) technology has been developed to combine the advantages of liner multi-channel bi-directional tape formats in common usage today with enhancements in the areas of timing-based servo, hardware data compression, optimized track layouts and high efficiency error correction code to maximize capacity and performance.

In the LTO technology, the read/write head includes servo reading elements, data reading elements, and data writing elements. The servo reading elements are used to read position error signal (PES), which is the mis-registration of the elements relative to the target location. In a typical operation, the servo reading element will read the pre-written PES format from the tape, and the LTO drives can use the detected PES as feedback to hold the read/write head at the target position. With the current LTO technology, the allowed PES error is close to 2 µm and is supposed to be close to 0.2 µm in the next 10 years.

The current read/write head manufacturing technology has a standard deviation of about 0.25 µm for the dimension between the servo reading elements and the data writing elements. In other words, even with perfect servo following with PES=0, data track targets have been written off +/−0.75 µm. This large variation can contribute to data loss and will be undesirable in future generation LTO formats.

BRIEF DESCRIPTION OF THE DRAWINGS

The accompanying drawings, which are incorporated in and form a part of this specification, illustrate some embodiments of the subject matter and, together with the description, serve to explain principles discussed below:

FIG. 5A illustrates a flow diagram of an example method of electronically measuring reader/writer offsets in a tape drive head, according to an embodiment.

Figure 1:
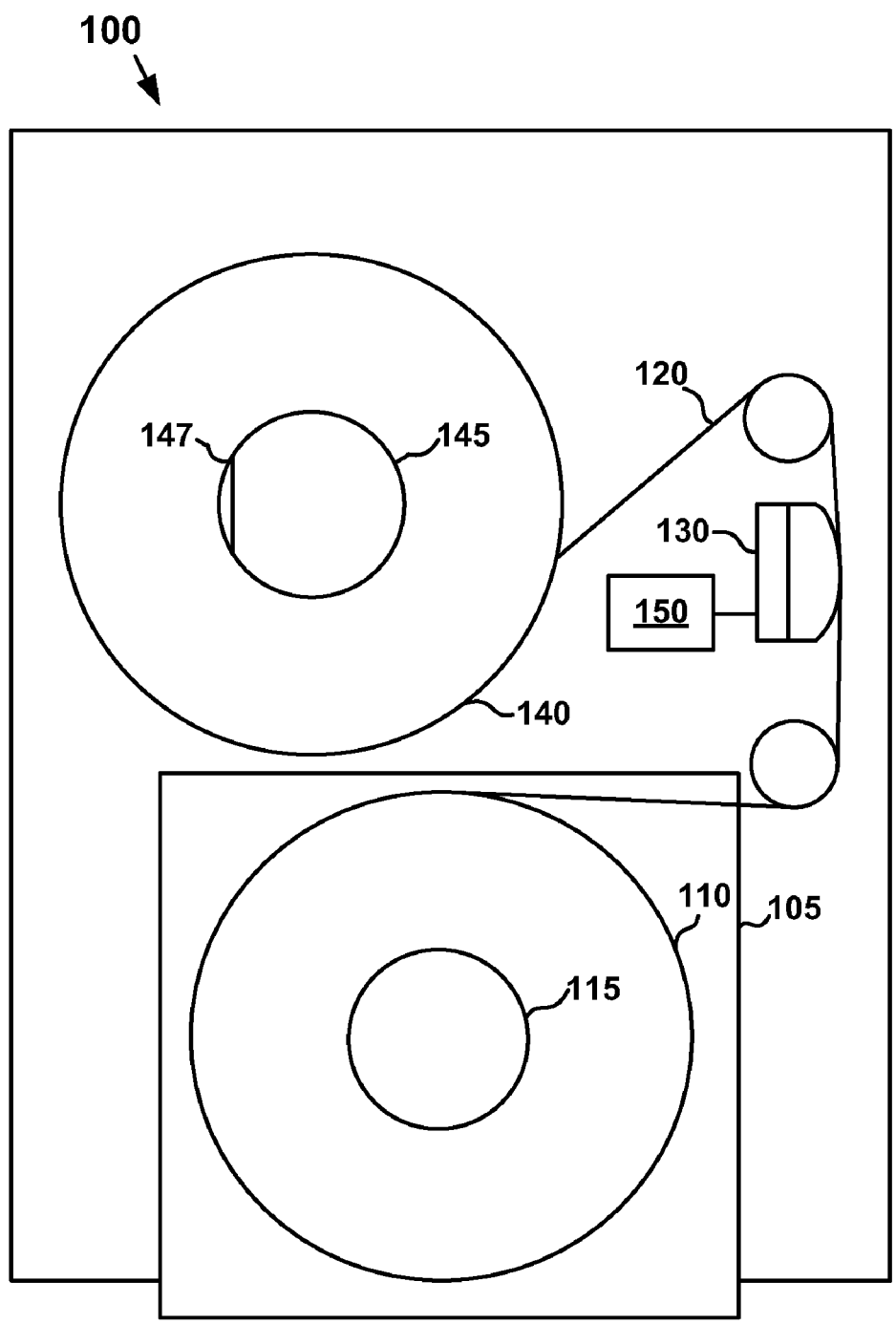
FIG. 1 is a diagram of an example tape drive, according to an embodiment.

The drawings referred to in this brief description should be understood as not being drawn to scale unless specifically noted.

DESCRIPTION OF EMBODIMENTS

Reference will now be made in detail to various embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments of the invention are intended to cover alternatives, modifications and equivalents, which may be included within the spirit and scope of the various embodiments of the invention as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "writing," "reading," "building," "measuring," "conditioning," "capturing," "correcting," "correlating," "calculating," "determining," or the like, refer to the actions and processes of a computer system, measurement module, microcontroller, processor, linear tape drive or portion thereof, or similar electronic computing device. The computer system or similar electronic computing device manipulates and transforms data represented as physical (electronic) quantities within the computer system's registers and memories into other data similarly represented as physical quantities within the memories or registers of computer system, storage device (e.g. tape drive), or other electronic computing device. For example, in some embodiments, as described herein, a processor/electronic computing device resides within and/or is coupled with a tape drive. In some embodiments a processor/electronic computing device is included in or takes the form of a storage system controller and/or offset measurement module as described herein.

Overview of Discussion

If a tape is written in different tape drives, any drive-to-drive offset will affect the location of the written data and can lead to a shift that will overwrite part of the data written in another tape drive. This becomes evermore important as track widths on a tape decrease, as the shift caused by an offset between a reader and writer or between heads in different tape drives, might be or become comparable to the entire written track width (particularly in future tape drives with narrower track widths and tolerances). In general, offsets between writers on a single head are small, but measurable, and typically due to manufacturing tolerances. However, as will be described, offsets between readers and writers on a single head are greater, and these offsets vary from drive to drive due to manufacturing tolerances, parts manufactured by different manufacturers, parts manufactured during different product runs, or head parts sourced from different areas of a head wafer.

Embodiments of the present invention include methods and systems to electronically measure the offset between the actual write element (writer) position and the ideal writer position, measured with respect to the read element (reader) position. Embodiments described herein involve writing a plurality of sequentially adjacent tracks (e.g., at least three), which may be trimmed tracks, and then scanning a track in the midst of the written tracks and analyzing the readback data to determine the offset between a reader and writer. This can be done simultaneously for multiple readers/writers in a drive, such as a sixteen channel drive. As described herein, this can be done during various stages of development and/or manufacturing, even before the tape drive is capable of writing or reading actual data. Various embodiments can be employed as a setup procedure, a quality control procedure, or a calibration procedure and can be performed at various levels of use, such as during manufacturing and/or by a user of an operational tape drive. Once offset is measured, a writer can be calibrated or offset by the measured amount of offset to optimize the writer's location to write data tracks on target.

Discussion will begin with a description of an example tape drive and an example tape and tape head with which, or upon which, embodiments described herein may operate. Discussion will proceed to a description of an example measurement module for a tape drive, which operates to electronically measure reader/writer offset in a tape drive. Components of the measurement module will be described. Operation of the example measurement module and its components will then be described in more detail in conjunction with descriptions of example methods of electronically measuring reader/writer offset in a tape drive.

Example Tape Drive

FIG. 1 is a diagram of an example tape drive 100, according to an embodiment. In one embodiment, tape drive 100 includes methods and or modules, as described herein, for measuring reader/writer offset in a tape drive. Tape drive 100 represents a generic tape drive, and is shown by way of example and not of limitation. In one embodiment, tape drive 100 operates in compliance with an LTO specification, such as LTO-5. It is appreciated that the subject matter described herein is not limited to use with/within tape drive 100, but instead is operable with/within a variety of tape drives. Tape drive 100 is shown with a tape cartridge 105 inserted into tape drive 100. Tape cartridge 105 is removable from tape drive 100, and includes a cartridge reel 110 with a cartridge reel hub 115. Tape 120 is spooled about cartridge reel hub 115 of cartridge reel 110. Tape cartridge 105 supplies tape 120 to tape drive 100. Tape drive 100 includes a drive reel 140 which takes up tape 120 from tape cartridge 105 (when inserted).

A portion of tape 120 (such as a leader) is coupled to drive reel hub 145 by means of a fastening device 147, such as, for example, a grabber or buckler. Fastening device 147 engages tape 120 and then integrates or blends with drive reel hub 145, thereby coupling tape 120 to drive reel hub 145. During operation of tape drive 100 and drive reel 140, tape 120 is spooled between drive reel 140 and cartridge reel 110 and in the process is guided longitudinally across head 130. Head 130 operates to read data from or write data to tape 120 as tape 120 travels longitudinally in proximity to head 130 while being spooled between drive reel 140 and cartridge reel 110. Head 130, in one embodiment, comprises multiple channels (e.g., sixteen channels) which are capable of simultaneously reading/writing a plurality of tracks on tape 120.

Measurement module 150 is communicatively coupled with head 130. In one embodiment, measurement module 150 measures offsets between read and write track operations so as to measure (and in some embodiments correct/reduce) offsets between read and write heads.

Figure 2:
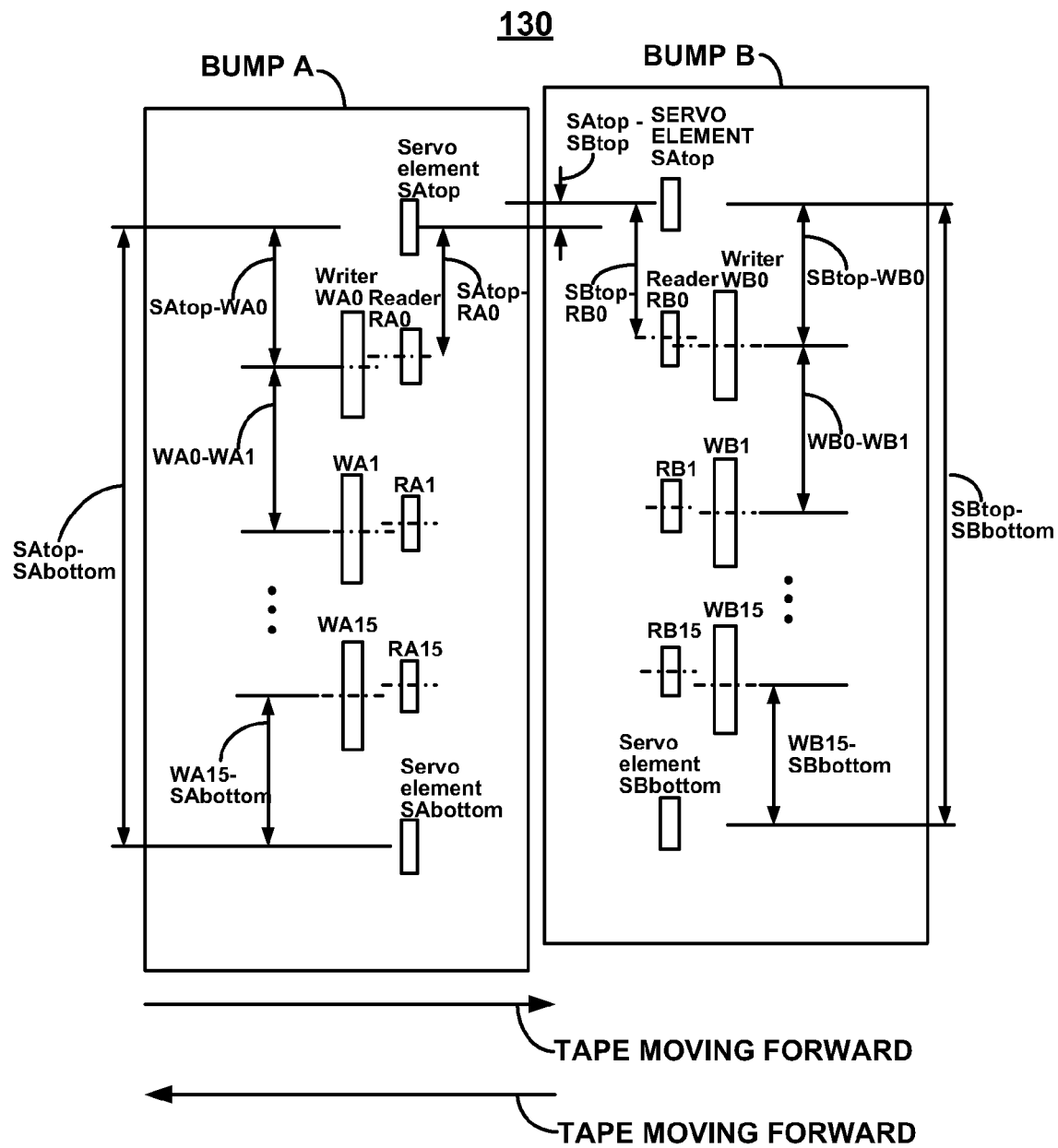
FIG. 2 illustrates an example read/write head of a tape drive, according to an embodiment.

FIG. 2 illustrates an example read/write head configuration of an LTO drive. In one embodiment, the configuration shown in FIG. 2 represents the configuration of head 130. In this configuration shown in FIG. 2, the head includes two separate head bumps, "bump A" and "bump B." In each head bump, there are two servo elements which are used for reading Position Error Signal (PES) on a tape 120 from top and bottom of the writers and readers; these are: SAtop and SAbottom for bump A; and SBtop and SBbottom for bump B. In each head bump, there are a plurality of writer elements (16 in this example) spaced evenly across the data band to write data tracks simultaneously, WA0, WA1, . . . to WA15 for bump A, and WB0, WB1, . . . to WB15 for bump B. In each head bump, there are 16 reader elements spaced evenly across the data band to read data tracks simultaneously, RA0, RA1, . . . to RA15 for bump A, and RB0, RB1, . . . to RB15 for bumpB. During the Read-While-Write mode, when tape moves forward from cartridge reel to drive reel, writers on bump A write data tracks, and readers on bump B read the data tracks immediately. Some LTO drives use servo elements on bump B to read PES because writers tend to induce noise on servo elements on the same bump. However, writers will be off target if the azimuth error is not corrected, including tape skew and the offset of the 2 bumps. In some embodiments, an LTO drive uses servo elements on bump A to read PES, in which case the head and flex design needs to handle the writer induced noise. Embodiments described herein are intended to find the offset between the servo elements and write elements on the same bump. In practice, the servo elements and reader elements are typically fabricated on the same layer during the wafer processing, and hence the offset is normally very small.

Therefore, in the description herein, the offset between writer/servo and the offset between writer/reader are used and referred to interchangeably.

FIG. 2 also illustrates some distances between portions of the head. "SAtop-SBtop" represents the distance between the centers of the SAtop servo element and the SBtop servo element. "SBtop-RB0" represents the distance between the centers of the SBtop servo element and the RB0 reader. "SAtop-RA0" represents the distance between the centers of the SAtop servo element and the RA0 reader. "SBtop-WB0" represents the distance between the centers of the SBtop servo element and the WB0 writer. "SAtop-WA0" represents the distance between the centers of the SAtop servo element and the WA0 writer. "WB0-WB1" represents the distance been the centers of the WB0 and WB1 writers. "WA0-WA1" represents the distance been the centers of the WA0 and WA1 writers. "WB15-SBbottom" represents the distance between the centers of the WB15 writer and the SBbottom servo element. "WA15-SAbottom" represents the distance between the centers of the WA15 writer and the SAbottom servo element. "SBtop-SBbottom" represents the distance between the centers of the SBtop and SBbottom servo elements. "SAtop-SAbottom" represents the distance between the centers of the SAtop and SAbottom servo elements.

Figure 3:
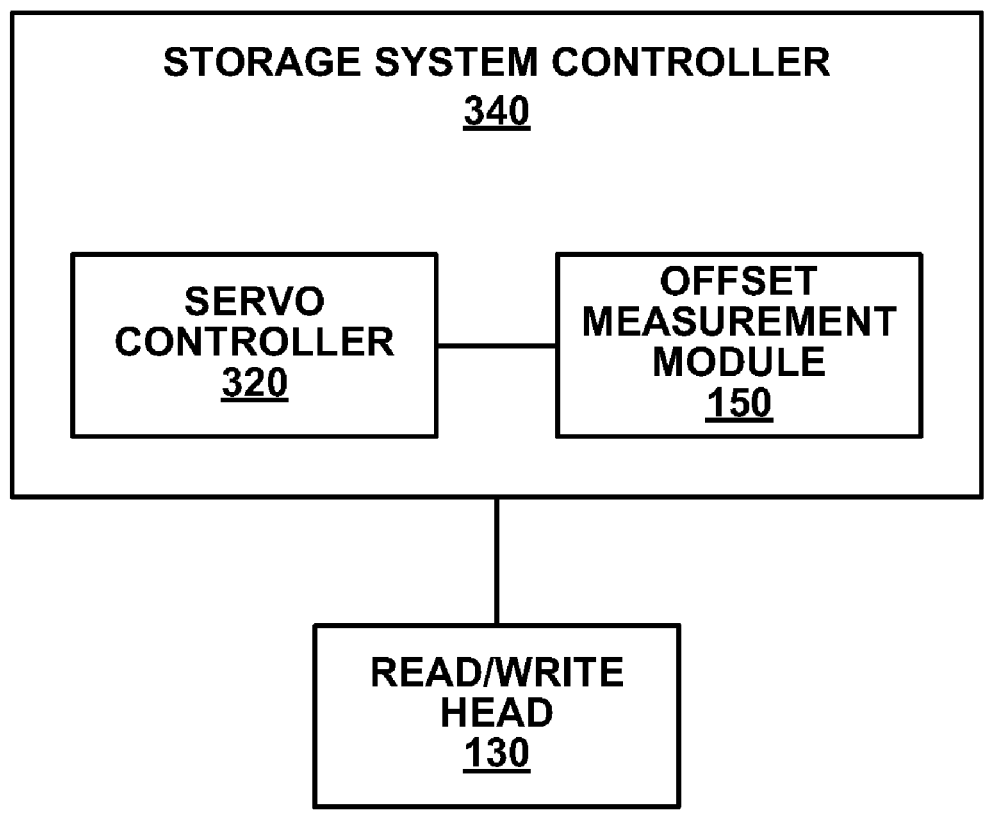
FIG. 3 is an illustration of a block diagram of control elements of storage system, according to an embodiment.

FIG. 3 is an illustration of a block diagram of control elements of tape drive 100, according to an embodiment. As shown in FIG. 3, in one embodiment, tape drive 100 comprises a storage system controller 340 for controlling operation of the different components of the tape drive 100. In one embodiment, storage system controller 340 includes or is coupled with a servo read/write controller 320 and offset measurement module 150. Servo read/write controller 320 processes servo signals supplied to and received from the read/write head 130. In one embodiment, offset measurement module 150 is coupled to read/write head assembly 130 and measures offsets between data reader elements (read heads) and data writer elements (write heads) in head 130. Such offset can be measured for one set of read/write heads on a channel or for a plurality of sets of read/write heads on a plurality of channels in head 130.

In one embodiment, offset measurement module 150 uses the measured offset value to calibrate a set of read/write heads to reduce a mis-registration error that is measured in the form of an offset between a reader and writer of head 130 or between a reader on a channel in one tape drive 100 and a writer of the same channel in another tape drive 100. For example, using techniques described herein, in one embodiment, the mis-registration error between a writer and reader of head 130 can be reduced from 0.25 µm (1-sigma) to 0.08 µm (1-sigma). Those skilled in the art will recognize that the measurement module 150 may be implemented in hardware, software, firmware or combination thereof in various embodiments. Further, those skilled in the art will recognize that although embodiments of the present invention are suitable for use with tape drives configured according to LTO technology and specifications, the embodiments are not limited to use with a particular type of tape storage system.

Figure 4:
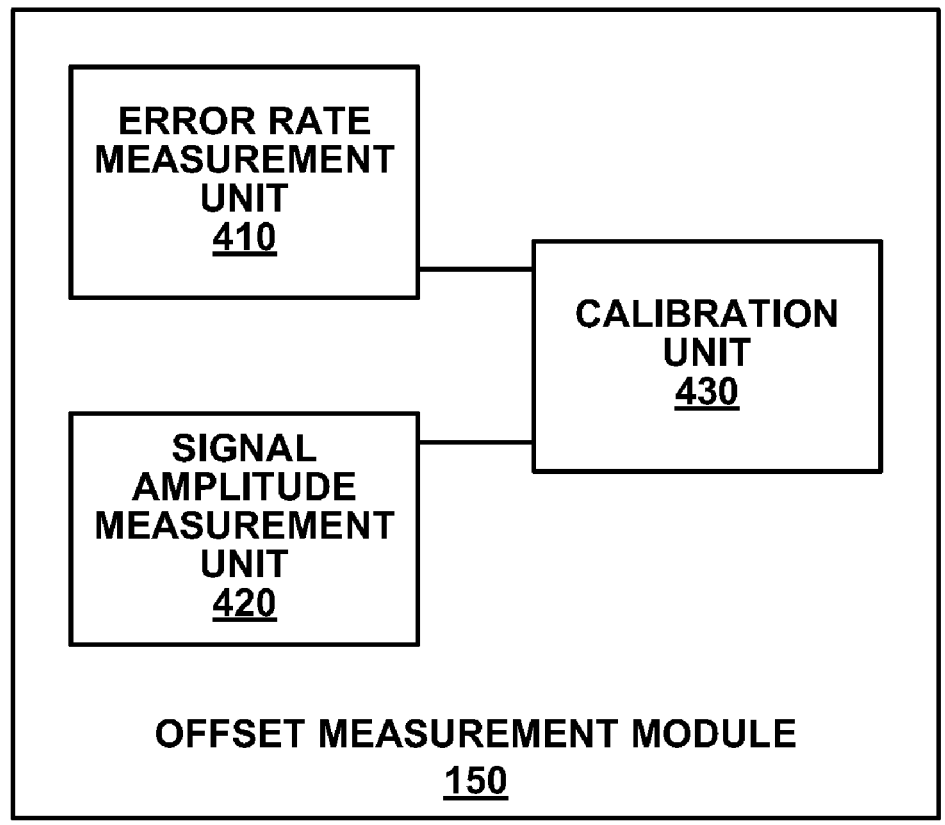
FIG. 4 illustrates a block diagram of an example of an offset measuring module for measuring reader/writer offsets, according to an embodiment.

FIG. 4 is a block diagram of an example offset measurement module 150, according to one embodiment. Through analysis of readback information, offset measurement module 150 electronically measures the offset between actual writer positions and the ideal writer positions measured with respect to the reader positions to determine a reader/writer offset. In one embodiment, as shown in FIG. 4, offset measurement module 150 comprises error rate measurement unit 410, signal amplitude measurement unit 420, and calibration unit 430. It is appreciated that in some embodiments, only one or two of units 410, 420, and 430 may be included in offset measurement module 150.

In one embodiment, offset measurement module 150 conditions a tape prior to measuring reader/writer offset. For example, by directing that a tape is moved, such as from beginning of tape to end of tape and then rewound, the tape is conditioned by exposing the tape to atmosphere and operational stress. This allows the tape dimensions to adjust prior to writing and reading data and to change less between the writing and reading of data.

Offset measurement module 150 is communicatively coupled with head 130 (examples of which are shown in FIGS. 1 and 3) and electronically measures a read-write offset of head 130. This offset can be measured in operation or in a factory environment during an assembly or testing phase of a tape drive.

In one embodiment, offset measurement module 150 supplies a signal to a writer element of head 130 which writes a number of sequentially adjacent tracks. These sequentially adjacent trimmed tracks can comprise tracks that, except for an initially written track (in some instances), trim an immediately adjacent previously written track by overwriting the previous track along a longitudinal edge. These tracks can also comprise tracks which are adjacent and even abutting, but do not trim one another. In various embodiments, either data or a pattern of signal tones (such as frequency tones) are written to the tracks. In one embodiment, previously written tracks, such as previously written data tracks, can be utilized.

In one embodiment, offset measurement module 150 directs a channel reader element, corresponding to the channel writer element used for writing the track, to read an interior track (not the first or the last of the sequentially adjacent tracks). During the reading, offset measurement module 150 receives and analyzes the information read by the reader and by other portions of head 130, such as servo channels, during readback of the track. In one embodiment, the same track is read a plurality of times. For example, a first read can be at the same location with which the track was written. This first read can be considered a zero offset read. On successive reads, the reader is offset with respect to the track prior to each of the plurality of reads, such that the track is read at a plurality of reader offsets across the width of the track. Offset measurement module 150 analyzes the information collected during the readbacks to determine an offset (if any) between the writer used to write the track and the reader used to read the track.

In one embodiment, where data has been written to the plurality of tracks, error rate measurement unit 410 measures error rates corresponding to data read at a plurality read of head offsets relative to the data track (which has been repetitively read). Error rate measurement unit 410 accesses channel error rate information, such as C1 error rate information, during readback of the above described track at a variety of track offsets. C1 error rate is a known type of readback error measurement in tape drives, such as LTO compliant tape drives. Error rate measurement unit 410 uses the accessed information to generate a bathtub shaped curve of the C1 channel error rate. The bathtub shaped curve relates error rate to position of the reader and allows determination of the magnetic center of the reader relative to the written track. As will become further evident, the bathtub curve makes evident the correlation between the error rate of the tracks written and the position of the reader with respect to the data written. An optimum reader position selected in the center of the bathtub shaped curve is an electronic measure of an optimum offset of the reader from the position of the writer which was used to write the data. This offset magnetically centers the read head in the data track written by the writer. In one embodiment error rate measurement unit 410 selects this optimum reader offset and supplies it to calibration unit 430.

In one embodiment, where a pattern of signal tones has been written to the plurality of sequentially adjacent tracks, signal amplitude measurement unit 420 captures signal tones corresponding to track readings at a plurality read head offsets relative to the track (which has been repetitively read). The captured signals comprise signal amplitudes read from the pattern of signal tones. For example, this can be accomplished through hardware settings which allow signal amplitude measurement unit 420 to capture the signals from the circuit board of a tape drive tested during the drive manufacturing process. This pattern of signal tones can be used in a manufacturing and/or design setting when channel development is not finished to the point that data can be written/read. In an embodiment, a bandpass filter is used for passing a selected signal tone of the pattern of signal tones. In various embodiments, the bandpass filter used for a selected frequency can comprise a low-pass filter, a high-pass filter, a notch filter, or a Fourier transform, among others. It is appreciated that separate filters can be utilized for each of a plurality of signal tones being captured.

A ratio of a signal amplitude read from the track to the signal amplitude read from above and below adjacent tracks is determined. A plurality of such ratios from a plurality of read head offsets of the track are used to generate a data set which can be represented as an inverted bathtub-like curve. This is referred to herein as a signal amplitude profile, and the inverted bathtub shaped curve of signal amplitude profile relates signal amplitude to position of the reader relative to the written track and allows determination of the magnetic center of the reader relative to the write element. As with the C1 bathtub curve, the signal amplitude profile makes evident the correlation between the signal amplitude of the tracks written and the position of the reader with respect to the pattern of signal tones which are readback. An optimum reader position selected in the center of the inverted bathtub shaped curve comprises an electronic measure of an optimum offset of the reader from the position of the writer which was used to write the pattern of signal tones. This optimum offset places the reader in the center of the track being read. In one embodiment signal amplitude measurement unit 420 selects this optimum reader offset and supplies it to calibration unit 430.

In one embodiment, calibration unit 430 receives the measured values of the magnetic center of the servo reading elements based on the measured channel error rate and/or based upon the measured amplitude from a readback of a signal pattern and then calibrates the tape drive for optimum channel performance. Calibration unit 430 corrects an offset between read and write positions of one or more channels of head 130 based upon the measured read/write offset. This calibration comprises, in one embodiment, supplying a signal to move the writer to this offset when writing data. It is appreciated that the above described technique can be used to calibrate writers with respect to the offset from readers in the same drive or with respect to a corresponding reader of the same channel in a different drive.

Error Rate Bathtub Curve Example

Figure 5B:
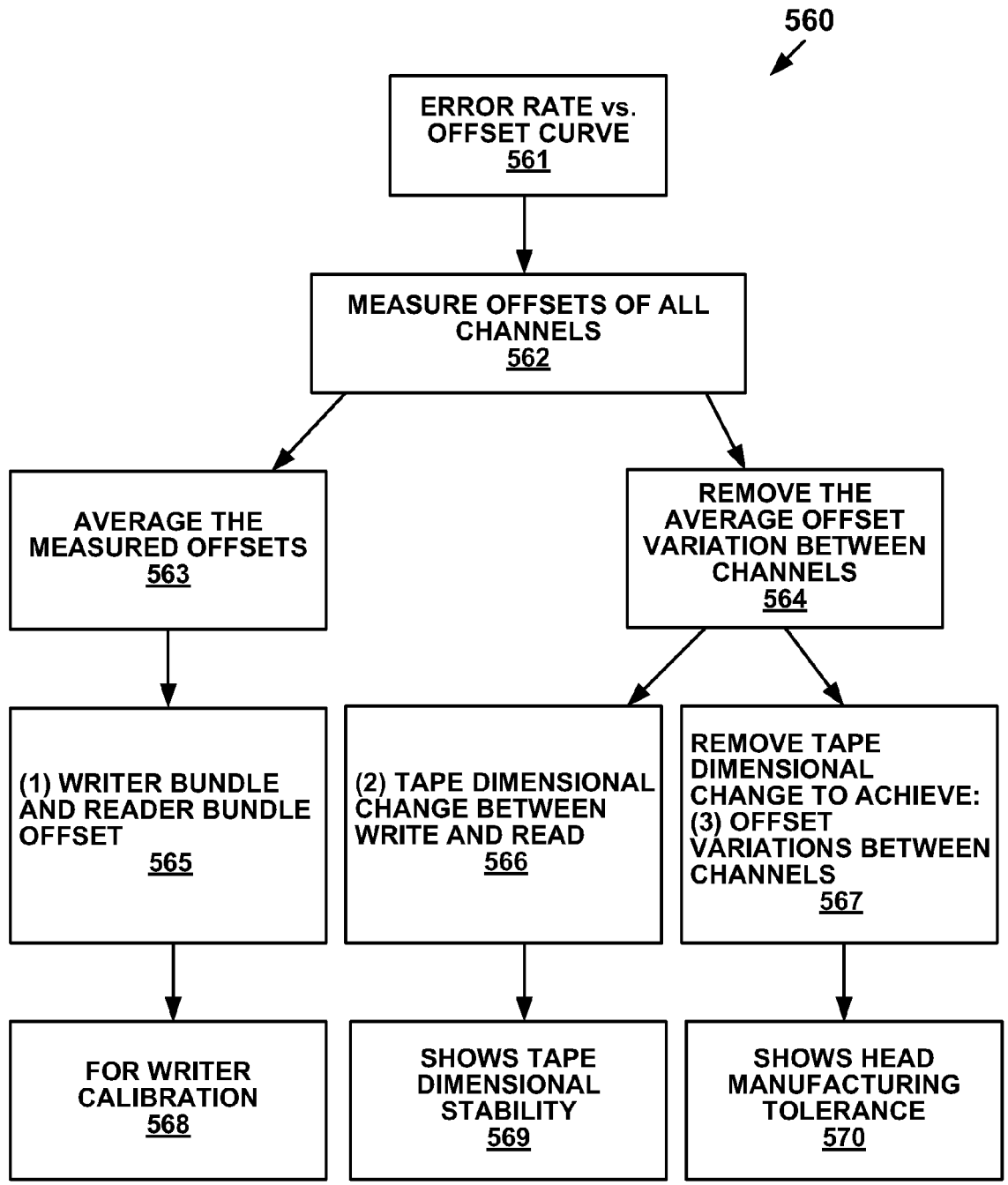
FIG. 5B illustrates a flow diagram of an example method of post processing offset information, according to an embodiment.

FIG. 5A is a flow diagram 500 illustrating example procedures of a method of electronically measuring reader/writer offsets in a tape drive head, according to an embodiment. Flow diagram 500 includes processes that, in various embodiments, are carried out by a processor under the control of computer-readable and computer-executable instructions. The computer-readable and computer-executable instructions for executing the method illustrated by flow diagram 500 reside, for example, in any tangible computer-readable storage media, such as data storage features internal or external to tape drive 100.

For example, in one embodiment the computer-readable and computer-executable instructions, reside on computer-readable storage media such as a ROM or firmware of a microcontroller which, is/are used to perform the functions of, or operate in conjunction with, for example, offset measurement module 150 of FIGS. 1, 3, and 4. In another example, such computer-readable and computer-executable instructions may reside on a computer-readable storage media such as a diskette (e.g., a Compact Disc Read Only Memory (CD-ROM)) which is used to control operation of a processor in a computer system coupled with tape drive 100.

Although a specific flow of procedures is disclosed in flow diagram 500, such a flow is provided for example. That is, embodiments are well suited to performing various other procedures or variations of the procedures recited in flow diagram 500. It is appreciated that the procedures in flow diagram 500 may be performed in an order different than presented, and that not all of the procedures in flow diagram 500 may be performed in every embodiment.

At 510 of flow diagram 500, in one embodiment, a tape from a tape cartridge is conditioned prior to writing information such as data or a pattern of signal tones to a plurality of sequentially adjacent tracks. Among other things, this can comprise error rate measurement unit 410 directing moving the tape from beginning of the tape to the end of tape, this conditions the tape. For example, the dimensions of the tape will alter slightly due to use of the tape. During this tape moving process, in one embodiment, the top and bottom servos of head 130 will read the servo format (PES code) from the tape. These servos are spaced about 3 mm from one another. They should read similar PES signals and determine the tape's band ID (identification) which is the timing of the top and bottom servo signals. If the top and bottom servo stripes are aligned perfectly, the timing on data bands at the top and bottom of head 130 will fall within an expected range. If there is tape skew due to a tilted head or tape, then the timing will be offset from the expected range. For example to identify a data band (0, 1, 2, 3, or the like) the timing difference between the top and bottom servo of a head is measured to determine the data band in which head 130 is located. In one embodiment, the top servo should detect a signal and the bottom servo should detect a signal 33 microns of tape later. It is appreciated, however, that different tapes have different distances between PES stripes (33 micron, 34 micron, 36 micron, and the like are some examples written by various media manufacturer). As will be further described, the band ID is measured from the top and bottom servo timing difference and corrected by the azimuth error and can be measured at the beginning for calibration purposes for use in post processing, to correct for tape skew during the process of reader/writer offset measurement.

At 520 of flow diagram 500, in one embodiment, a plurality of sequentially adjacent tracks is written on a tape with a write head of a tape drive. In one embodiment, error rate measurement unit 410 directs that data is written to these tracks and the tracks are data tracks. In another embodiment, described more fully below, a pattern of signal tones is written to the tracks. Error rate measurement unit 410 directs that the writing comprises writing either a plurality of sequentially adjacent forward tracks or writing a plurality of sequentially adjacent reverse tracks.

Figure 6:
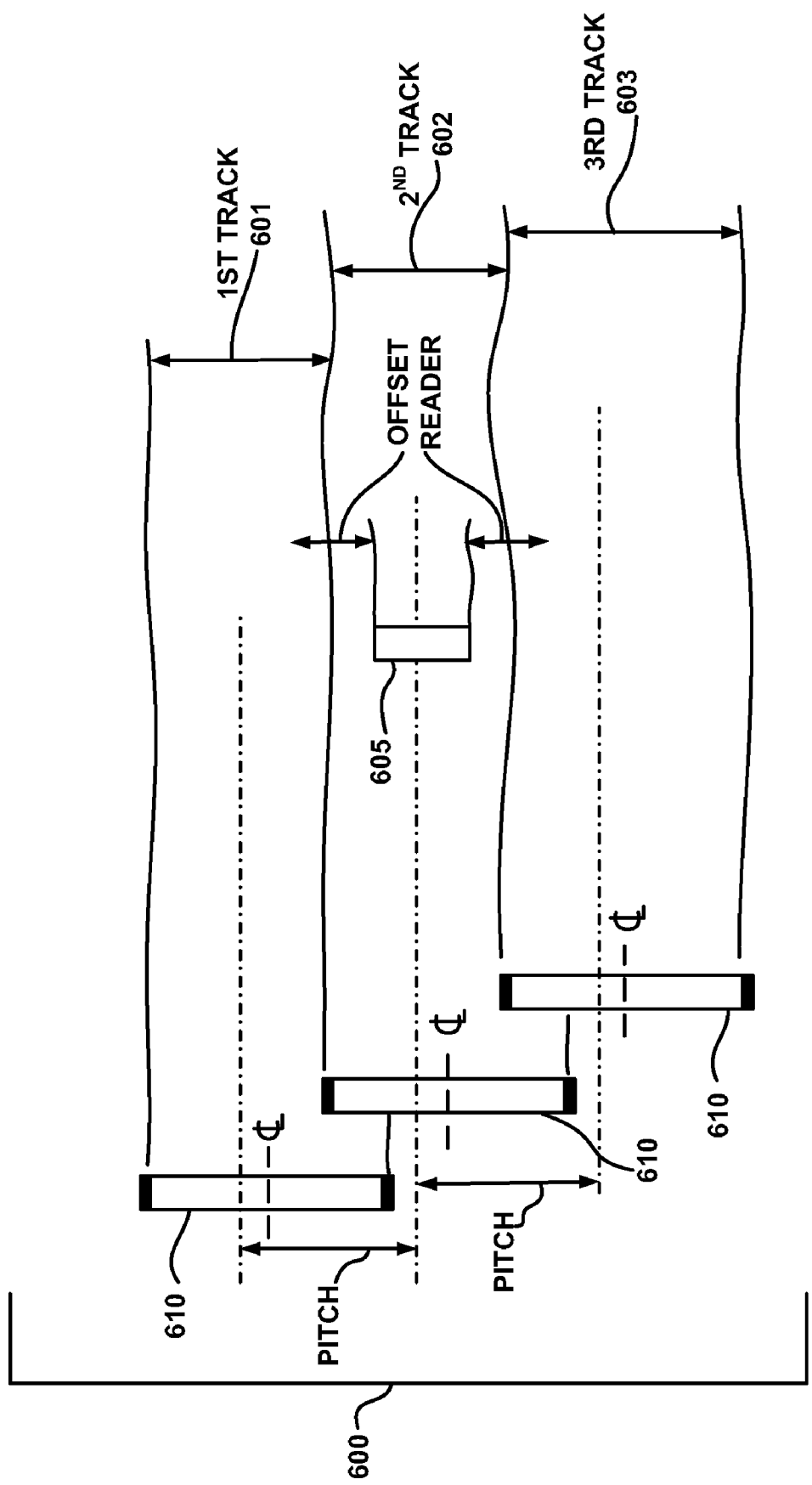
FIG. 6 illustrates an example data write pattern and read operation, according to an embodiment.

FIG. 6 shows a plurality of tracks 600 comprising at least three tracks. As shown in FIG. 6, track 601 is written on a tape such as tape 120 with a writer 610 of head 130. The tape is rewound and track 602 is written adjacent to track 601 with writer 610. As can be seen, track 602 overwrites and thus trims a portion of track 601. In a similar fashion, the tape is rewound and a third track 603 is written adjacent to track 602 with writer 610. As can be seen, track 603 overwrites and thus trims a portion of track 602. Tracks 601-603 are sequential and adjacent, with track 602 being an interior track surrounded above and below by others (601, 603) of the sequentially written adjacent tracks. Reader 605 is a reader associated with the same channel as writer 610. After writing of tracks 600, reader 605 is used to read from track 602. In conjunction with a plurality of readings of track 602, reader 605 is offset to varying degrees upwards toward track 601 or downward to track 603 prior to readings of track 602. Although tracks 600 are shown as trimmed tracks, this is not meant to limit embodiments to trimmed tracks. On the contrary, in some embodiments, the sequentially adjacent tracks are written such that they are merely adjacent, even abutting on longitudinal edges, but not trimming one another.

At 530 of flow diagram 500, in one embodiment, the method measures error rate information with a read head of a tape drive while reading a data track of the plurality of sequentially adjacent data tracks. The read head can be in the same head 130 in the same tape drive as the write head which wrote the tracks, or can be a read head in a different tape drive from the tape drive which wrote the data tracks. The data track that is read comprises an interior data track of the plurality of sequentially adjacent data tracks and is surrounded by other data tracks of the plurality of sequentially adjacent data tracks.

At 540 of flow diagram 500, in one embodiment, the method builds a bathtub shaped curve from a set of the error rate information which is measured. The set of error rate information is accumulated by reading the data track at a plurality of offsets of read head 605 relative to the data track being read (e.g., data track 602 from the above example). The plurality of offsets can take place during one reading of the data track or during a plurality of readings of the data track. In one embodiment, for example, error rate measurement unit 410 directs that this data track is read a plurality of times with each reading occurring at one of a plurality of different offsets of reader 605 with respect to the data track. The number of times which constitutes the plurality of readings can vary and is governed by the number of readings desired to produce a level of confidence in the data set. Thus, the plurality of readings could comprise 5 readings, 51 readings, or 1001 readings, or some other number. In one embodiment, the C1 error rate information is measured during each of the plurality of readings. In one embodiment, error rate measurement unit 410 directs that this data track is read only once but with a plurality of different offsets of reader 605 with respect to the data track while the tape moves. In one embodiment, the C1 error rate information is measured during each of the plurality of offsets.

Figure 5C:
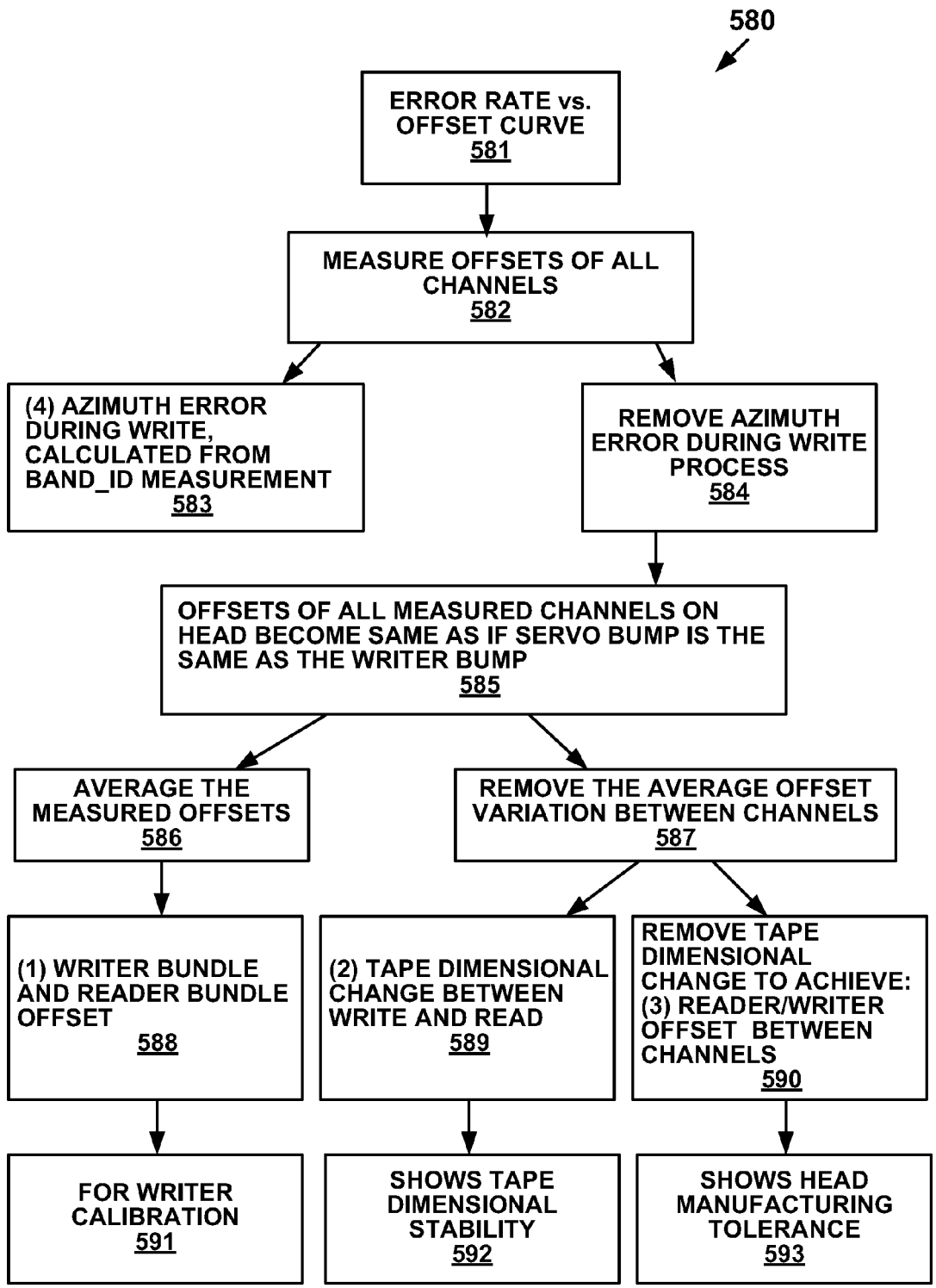
FIG. 5C illustrates a flow diagram of an example method of post processing offset information, according to an embodiment.

In one embodiment, while reading and measuring the error rate information in 530 and 540 of the method of flow diagram 500, a plurality of serial variables are captured. In an embodiment, the serial variables include one or more of: a top position error signal value (PES_top) and a bottom position error signal value (PES_bottom) for each offset position of a reader; a position error signal azimuth (PES_azi); a time band identification (Time_bandID); and a time for the tape to spool 100 µm past the read head (Time_100 µm). Several of these variables are also captured during writing of the tracks and/or conditioning of the tape, and are used or can be used for comparative purposes to determine changes in the tape during reading and writing. In one embodiment, captured serial variables are saved in a memory or a computer data file. As shown in elements 561-570 of flow diagram 560 of FIG. 5B, post-processing the accumulated offset information, in one embodiment, involves using these serial variables to de-convolute the measured offset values into 3 components: (1) reader bundle to writer bundle offset for calibration, (2) tape dimensional change between write and read, and (3) the channel-to-channel variations of the writer/reader offset. As shown by elements 581-593 of flow diagram 580 in FIG. 5C, in one embodiment, if the servo bump and writer bump are different during write process, post-processing the accumulated offset information uses these variables to de-convolute the measured offset values into four components, including the previously mentioned three components, and (4) the data track offset due to azimuth error.

As shown in FIG. 2, a read head typically has four servo readers on two servo "bumps." The servo readers are arranged in a rectangle surrounding the readers and writers: top left servo reader, bottom left servo reader, top right servo reader, and bottom right servo reader. PES_top is measured from a top servo reader on one side (for purposes of example, the right side); PES_bottom element is measured from the bottom servo reader on the same side that PES_top is measured from (bottom right servo reader in this example); PES_azi is measured from the adjacent servo reader to the top servo reader (the top left servo reader in this example). With three measured PES variables several items can be determined, including tape position, tape expansion, and tape skew.

Time_bandID is the bottom servo timing (microseconds) relative to the top servo timing. In one embodiment, band ID is calculated as: Band_ID=(Time_bandID/Time_100 µm)*100 µm. Azimuth error is calculated by subtracting the azimuth PES (e.g., PES_azi) from the top position error (e.g., PES_top). The tape dimension change (expansion) is calculated by subtracting the PES_bottom from the PES_top. The writer location and tracking performance is determined by calculating the mean and standard deviation of the PES_top and the PES_bottom. Data from the reading of the track is processed, in part, by calculating the tape dimensional change during the read process by subtracting the PES_bottom from the PES_top. The result is compared to the tape dimension during the data write process to generate the dimensional change between write and read of the tape. The reader location and performance are also tracked by calculating the mean and standard deviation of the PES_top and PES_bottom. The edges of the data track being repeatedly read (e.g. track 602) are calculated by a pre-established threshold, such as 0.8% C1 error rate (referred to as the edge bit error rate (EBER)). Other EBERs which are higher or lower, such as 0.5%, 1% or 2%, can be used in other embodiments. Examples of numerous of these processing results and example are shown in Table 1 below. In table 1, data from write 1 (e.g., data track 601) is not shown, because the top edge of this written track is not used.

In one embodiment, when error rate measurement unit 410 builds the bathtub curve it corrects the curve to remove disturbances in the data caused by tape expansion. In one embodiment, when building the bathtub curve error rate measurement unit 410 corrects the curve to remove disturbances in the data caused by tape skew. For example, in an embodiment where only C1 error rate information is used with PES information (and the data is not corrected for tape expansion and/or tape skew) the data used to generate the curve will be more spread out because it will include errors for tape dimension change, and the curve will be shifted due to tape skew error. Capturing and utilizing available serial variables, as described herein, allows these errors to be removed so that the real offset of the head can be more easily and accurately measured.

can comprise storing the measured offset in a memory, such as an electrically erasable programmable read only memory (EEPROM) of a tape drive (e.g., tape drive 100). Fore example, this EEPROM or memory can be included in calibration unit 430 so that the offset can be calibrated out, or corrected for during operation of tape drive 100.

Figure 8:
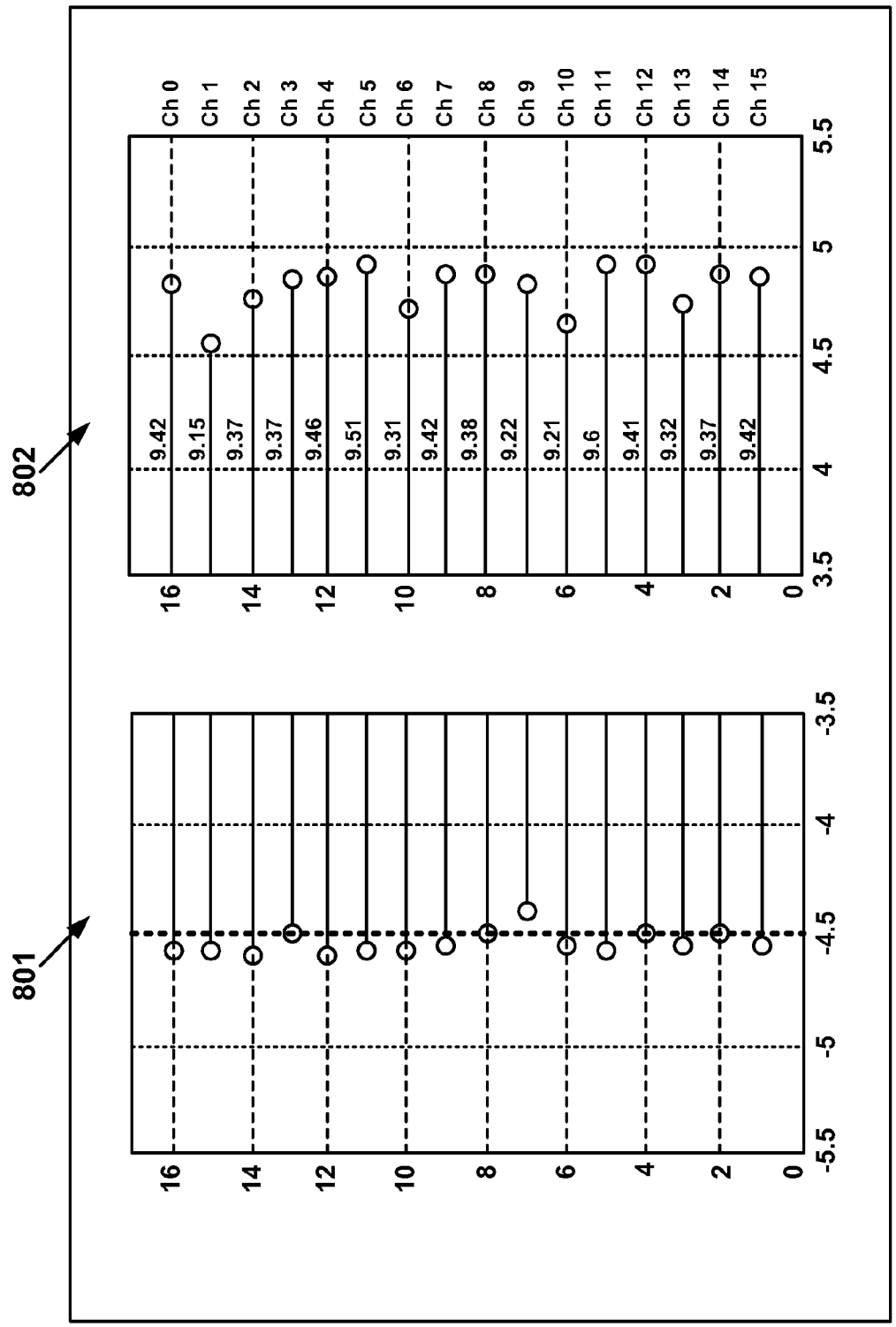
FIG. 8 illustrates an example graphical representation of writer/reader offsets for a sixteen channel tape drive as correlated from C1 error rates, according to an embodiment.

FIG. 8 illustrates an example graphical representation of writer/reader offsets for a sixteen channel tape drive as cor-

TABLE 1

Sample post-processing result:

| Process | PES | PES std dev | AZI | DIM | ID | Comments |
|---|---|---|---|---|---|---|
| Move Tape | 24.4768 | 0.1262 | −0.8221 | 0.7168 | 31.9098 | Tape Band ID 33.48 μm |
| Write 2 | 26.3931 | 0.1412 | — | 0.4802 | 32.0609 | Azimuth Error −0.74 μm |
| Write 3 | 12.0889 | 0.1422 | — | 0.4881 | 32.0475 | Azimuth Error −0.75 μm |
| Read 1 | 19.3576 | 0.1413 | — | 0.4959 | — | |
| Read 2 | 19.4240 | 0.1410 | — | 0.5172 | — | |
| ... | ... | ... | ... | ... | ... | |
| Read n | 29.6699 | 0.1305 | — | 0.7319 | — | Dimension change 0.24 μm |

Figure 7:
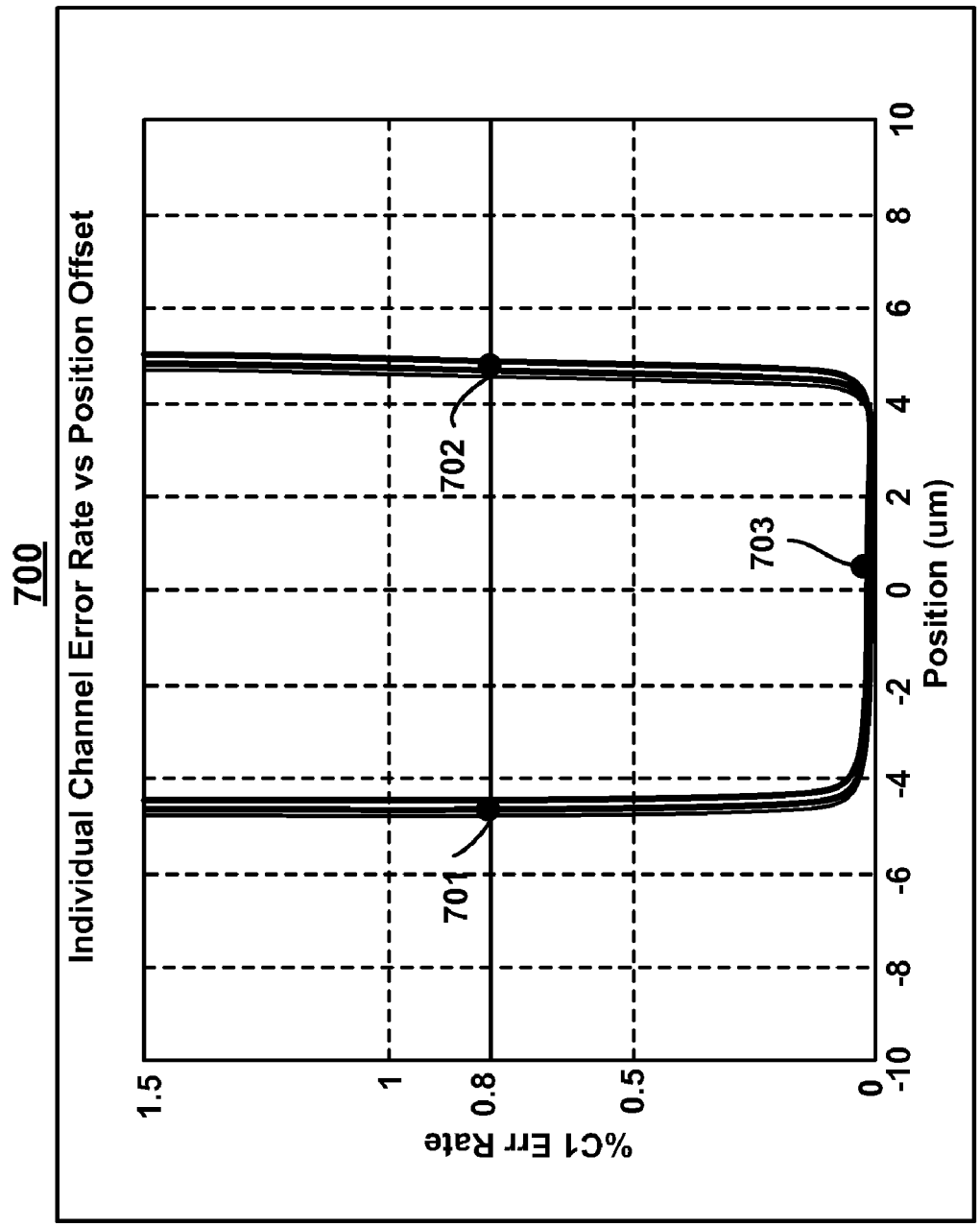
FIG. 7 illustrates a graph showing an example C1 bathtub curve, according to an embodiment.

FIG. 7 illustrates a graph showing an example C1 bathtub curve 700, according to an embodiment. In one embodiment, curve 700 is built by error rate measurement unit 410. Curve 700 shows overlapped plots of error rate curves for a plurality of read/write channels of a single head. With reference to FIG. 6, as read head 605 is progressively offset from the center of track 602 toward each of the two track edges shared with the above and below adjacent tracks (e.g., tracks 601 and 603), the C1 error rate will increase until it eventually reaches 100% as read head 605 is offset so far that data is no longer being read from the track (e.g., track 602). This set of error rate information will produce a bathtub shaped curve if analyzed versus positional offset of read head 605. In the basin portion of curve 700, the error rate is low, because the read heads are in, or mostly in, the track. The edges of the tub show where the error rate has increased as the read heads were offset further from the center of the data tracks being read. Markings (points 701, 702) exist on curve 700 at the location where a 0.8% EBER line crosses curve 700.

At 550 of flow diagram 500, in one embodiment, the method measures offset of the read head relative to the write head of the same channel. For example, in one embodiment, error rate measurement unit 410 accomplishes this by determining an offset of the read head which correlates to a magnetic center of the data track relative to the reader as represented by a center point between edges of the bathtub shaped curve built from error rate information. With reference to curve 700, in one embodiment, a position 703 in the basin of the curve is chosen between two points (701, 702) that are established at an EBER of approximately 0.8% on the edges of curve 700. As evident from curve 700, in one embodiment, this indicates a read head offset of approximately +0.45 to +0.5 μm for each of the plurality of heads shown by curve 700. In other embodiments, the center of the basin can be determined in other manners or through the pre-selection of a greater or lesser EBER percentage. It is appreciated that, in one embodiment, error rate measurement unit 410 also computes the width of a read track, such as track 602, by determining the span in position between points 701 and 702 in curve 700.

In one embodiment, error rate measurement unit 410 provides the measured offset to calibration unit 430 so that the measured offset can be calibrated out of one or more read/write channels or otherwise reduced or improved upon. This related from C1 error rates, according to an embodiment. FIG. 8 shows where the bathtub curve crosses 0.8% C1 threshold which is used, in one embodiment, to define the upper and lower edges of a read track, such as track 602. 801 corresponds to 701 in FIG. 7 and 802 corresponds to 702 from FIG. 7. Offset is represented by the average of 801 and 802. As can be seen by the tight clustering, reader/writer offset within a drive is fairly consistent.

Figure 9:
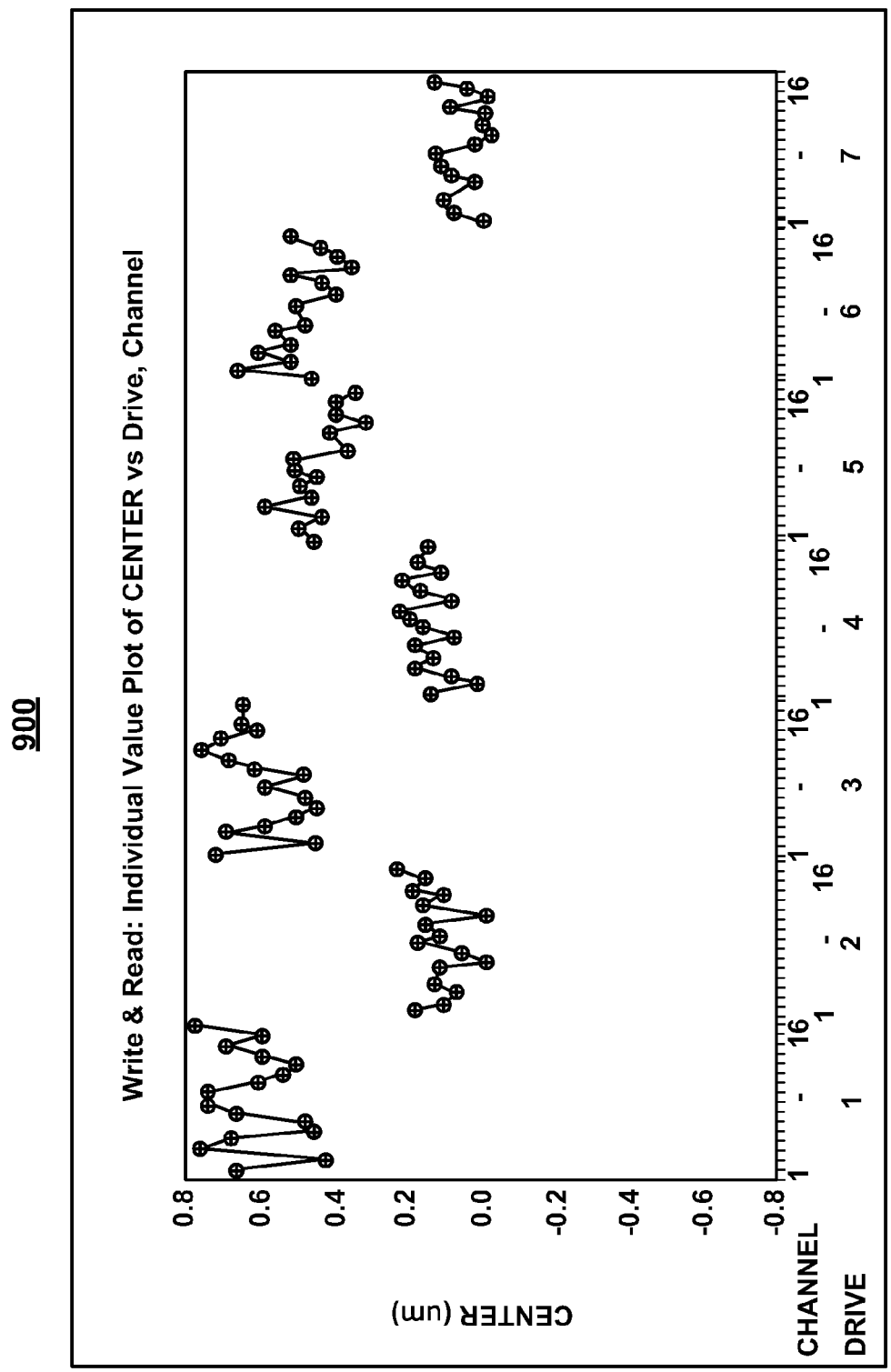
FIG. 9 is an example graphical representation of reader/writer offsets of seven drives each having sixteen write/read channels, according to an embodiment.

FIG. 9 is an example graphical representation 900 of reader/writer offsets of seven drives each having sixteen write/read channels, according to an embodiment. Graph 900 shows that reader/writer offset data for each of the drives is clustered and fairly consistent within a drive. Offsets range from 0.6 microns to 0.0 microns amongst the drives. This shows that there is a small error between channels in a drive and larger error between drives. Conceptually this can be explained because readers and writers of a single head (e.g. head 130) are fabricated all at once in one part of a wafer, while heads on different drives may come from different wafers or different positions on a wafer than other heads. Thus fabrication errors on a single head are relatively small in one tape direction, but large compared from head to head or from forward to reverse tape direction.

TABLE 2

ANOVA (Analysis of Variances) of reader/writer offset on 7 drives

| Variance Components Source | Var Comp | % of Total | StDev |
|---|---|---|---|
| Drive | 0.058 | 90.03 | 0.240 |
| Channel | 0.006 | 9.97 | 0.080 |
| Total | 0.064 | | 0.253 |

Table 2 shows an analysis of the data from FIG. 9 showing how there is a larger standard deviation from head to head than between channels on heads. The overall standard deviation across all heads and channels is the total. It is larger still. By correcting for the head-to-head error, only the smaller channel to channel error is left remaining. In Table 2 the analysis of variance (ANOVA) results (from FIG. 9) indicate that the total offset sigma is 0.253 μm. However, the channel to channel component within each drive is only 0.08 μm, and the drive to drive component contributes the most and is 0.24 µm. Therefore, with the measurement of offset and calibration/correction of offset as described herein, a 0.24 µm sigma error can be corrected and the only component left is the channel to channel error of 0.08 µm sigma.

Signal Amplitude Curve Example

Figure 10:
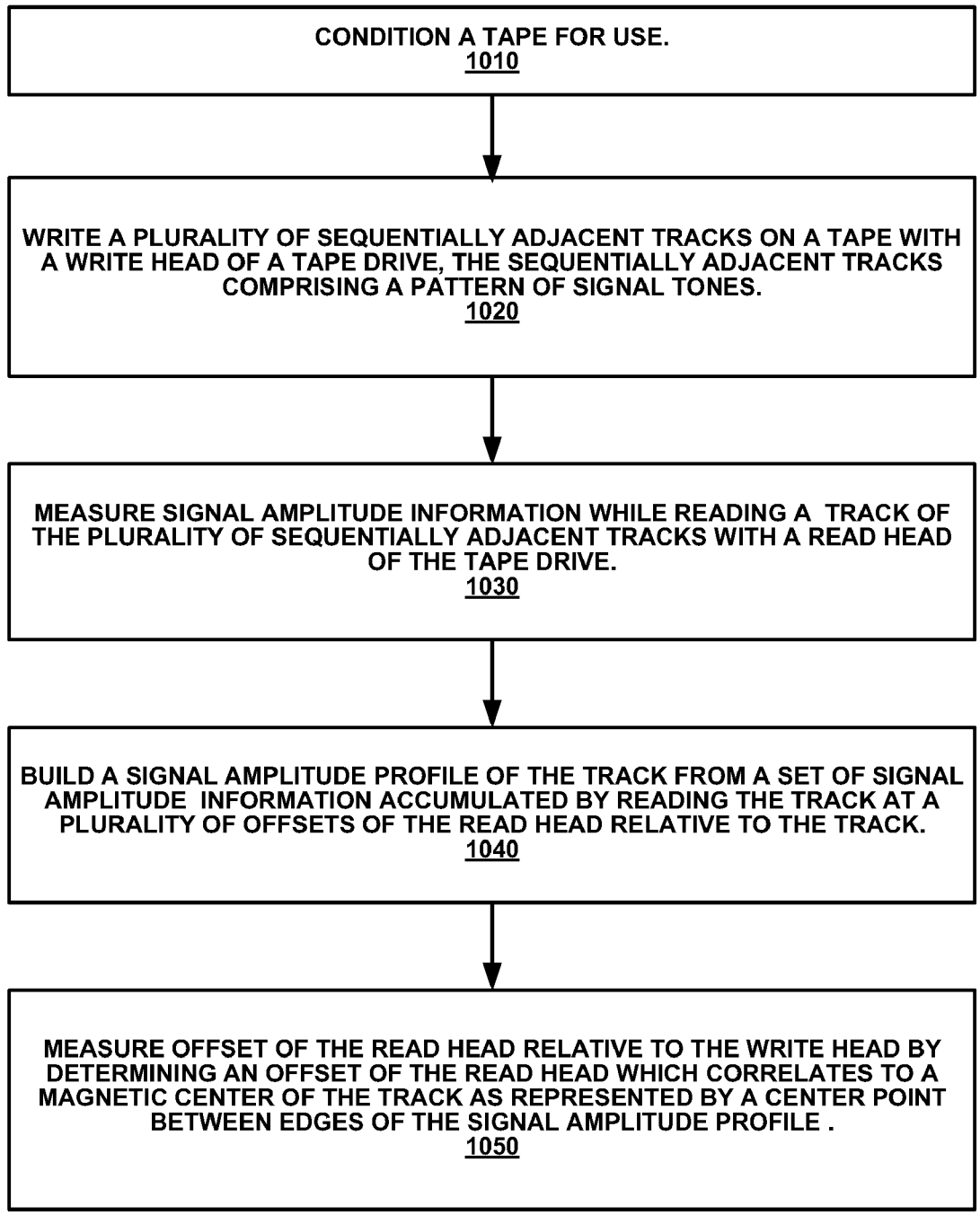
FIG. 10 illustrates a flow diagram of a second example method of electronically measuring reader/writer offsets in a tape drive head, according to an embodiment.

FIG. 10 is a flow diagram 1000 illustrating example procedures of a method of electronically measuring reader/writer offsets in a tape drive head, according to an embodiment. In one embodiment, the process described in flow diagram 1000 is utilized before a tape drive being manufactured or designed is capable of actually reading and writing data. Flow diagram 1000 includes processes that, in various embodiments, are carried out by a processor under the control of computer-readable and computer-executable instructions. The computer-readable and computer-executable instructions for executing the method illustrated by flow diagram 1000 reside, for example, in any tangible computer-readable storage media, such as data storage features internal or external to tape drive 100.

For example, in one embodiment the computer-readable and computer-executable instructions, reside on computer-readable storage media such as a ROM or firmware of a microcontroller which, is/are used to perform the functions of, or operate in conjunction with, for example, offset measurement module 150 of FIGS. 1, 3, and 4. In another example, such computer-readable and computer-executable instructions may reside on a computer-readable storage media such as a diskette (e.g., a Compact Disc Read Only Memory (CD-ROM)) which is used to control operation of a processor in a computer system coupled with tape drive 100.

Although a specific flow of procedures is disclosed in flow diagram 1000, such a flow is provided for example. That is, embodiments are well suited to performing various other procedures or variations of the procedures recited in flow diagram 1000. It is appreciated that the procedures in flow diagram 1000 may be performed in an order different than presented, and that not all of the procedures in flow diagram 1000 may be performed in every embodiment.

At 1010 of flow diagram 1000, in one embodiment, a tape from a tape cartridge is conditioned prior to writing information such as data or a pattern of signal tones to a plurality of sequentially adjacent tracks. Among other things, this can comprise signal amplitude measurement unit 420 directing moving the tape from beginning of the tape to the end of tape, this conditions the tape. Reference is made to 510 of flow diagram 500 for further description of conditioning of a tape.

At 1020 of flow diagram 1000, in one embodiment, the method writes a plurality of sequentially adjacent tracks on a tape with a write head of a tape drive. These may comprise forward tracks or reverse tracks. The sequentially adjacent tracks comprise a pattern of signal tones written on the tracks. For example, in one embodiment, this comprises signal amplitude measurement unit 420 (FIG. 4) directing head 130 to write at least three tracks such as tracks 600 shown in FIG. 6. As previously described, the sequential tracks are all written with one write head, such as write head 610. However, it is appreciated that in a tape drive with a plurality of channels, a plurality of write heads can simultaneously be instructed to each write its own plurality of sequentially adjacent tracks. In one embodiment, a tone of the pattern of signal tone comprises a tone of a single frequency, such as a sine wave, which is recorded on all or a portion of one of the tracks. The pattern of signal tones can be written in a variety of manners, some examples of which are illustrated in FIG. 11 and FIG. 12.

Figure 11:
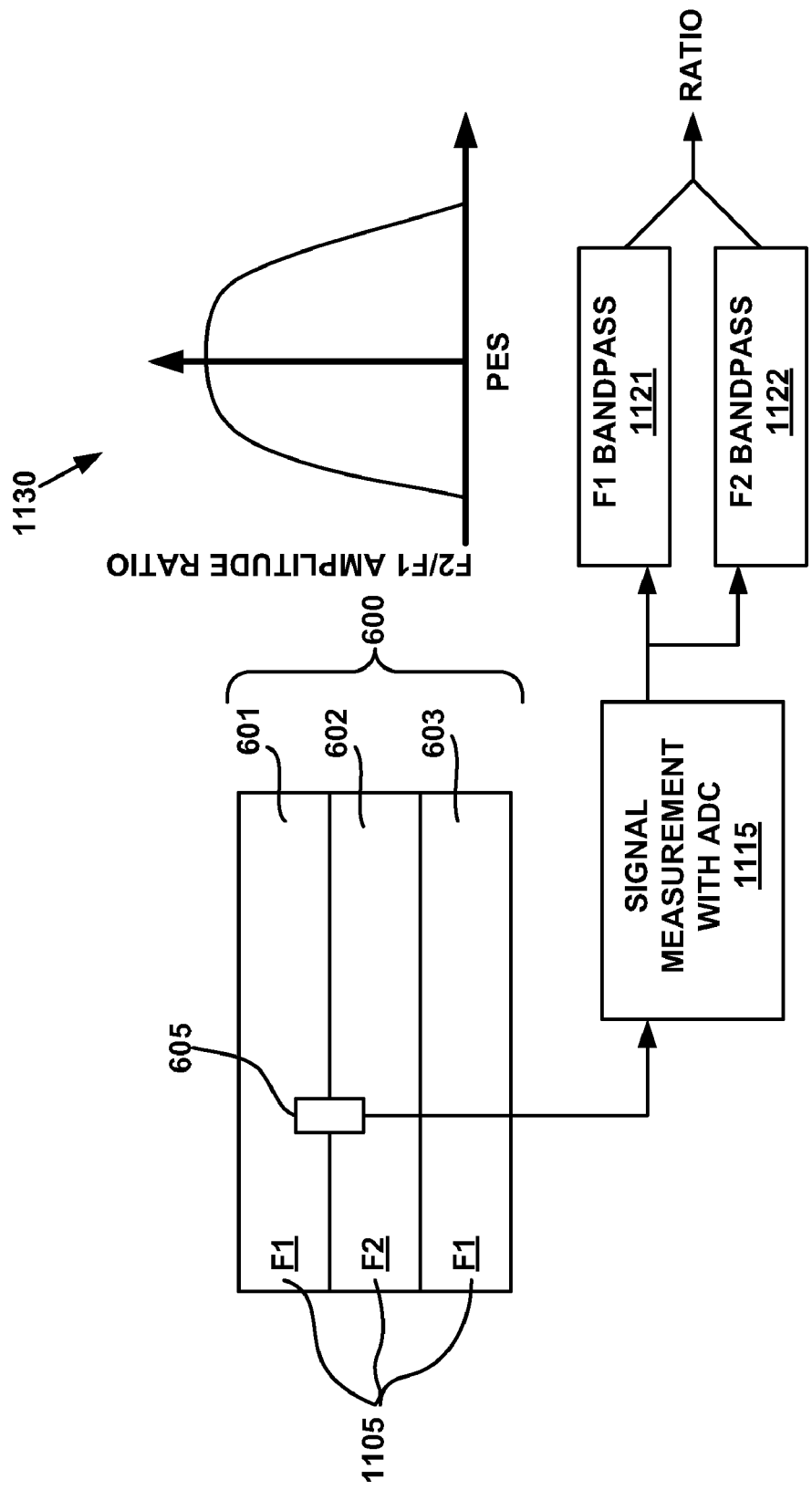
FIG. 11 illustrates an example signal tone pattern written to a tape in conjunction with a block diagram of an example signal amplitude offset measurement module for measuring the reader/writer offsets, according to an embodiment.

FIG. 11 illustrates an example signal tone pattern 1105 written to a tape and shown in conjunction with a block diagram of an example signal amplitude offset measurement module for measuring the reader/writer offsets, according to one embodiment. In one embodiment, during the writing of the sequentially adjacent tracks, signal amplitude measurement unit 420 directs writing tones of two preselected frequencies in an alternating pattern 1105 such that alternating adjacent tracks of the sequentially adjacent tracks have alternating frequency tone. As illustrated in FIG. 11, the three sequentially adjacent tracks 600 are written with adjacent track pairs each having a frequency tone different than the other. For example, track 601 is written with a frequency F1, track 602 is written with a frequency F2, and track 603 is written with a frequency F1. If more tracks were written, this alternating pattern would repeat. In one embodiment, frequency F1 is a sine wave of a first frequency while frequency F2 is a sine wave of a second and different frequency. In one embodiment, F1 can be selected at a frequency of, for example, 10 Mhz while F2 is selected at frequency of, for example, approximately 1.67 Mhz. It is appreciated that these frequencies are supplied as examples and that other frequency combinations can be used in other embodiments. In one embodiment, for example, F1 is chosen to perform erasure and F2 is chosen to maximize signal amplitude. In such an example, use of a bandpass filter may be unnecessary, thereby reducing the complexity of supporting circuitry and modules.

Figure 12A:
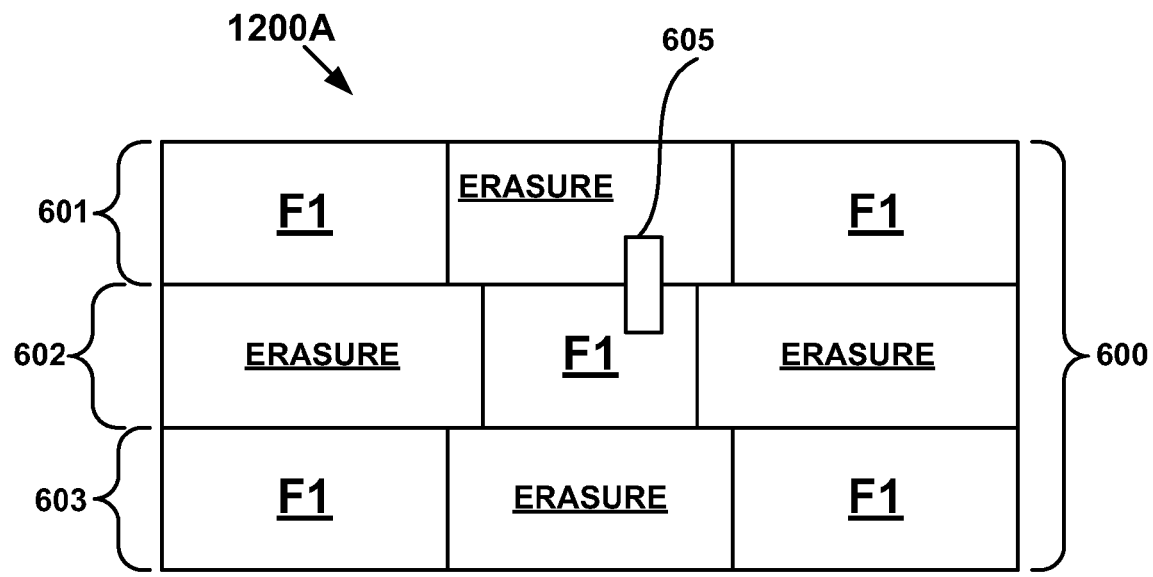
FIG. 12A illustrates an example of an alternating written pattern of signal tones and erasures on a tape, in accordance with an embodiment.

FIG. 12A illustrates an example of an alternating written pattern 1200A of signal tones and erasures on a tape, in accordance with an embodiment. In one embodiment, during the writing of the sequentially adjacent tracks, signal amplitude measurement unit 420 directs writing segments of erased tape regions alternated with sections of tape regions upon which a tone of a single preselected frequency is recorded. In one embodiment, this type of pattern 1200A with a single frequency F1 is used when tape drive electronics have an unbalanced amplification of frequency tones of differing frequencies. Using a single frequency in somewhat of a checkerboard pattern with segments of erased tape eliminates problems due to difference in amplified gain of different frequencies (e.g., F1 and F2) which could induce error in a process that depends on a ratio of signal amplitudes read from adjacent tracks. The segments of frequency F1 and erasure can be of a variety of lengths but in general should be kept short enough such that errors induced by tape movement are kept low. Longer segments of frequency F1 allowing for averaging, while shorter segments reduce the chance for tape perturbations to cause error. In one embodiment, pattern 1200A comprises a series of longer erasures and shorter frequency segments on one set of tracks (e.g. tracks 601 and 603) and on alternating tracks (e.g. track 602) the pattern is reversed with shorter frequency segments and longer erasure segments. This allows for a pattern 1200A, in one embodiment, in which a frequency segment (F1) is never simultaneously present on any alternating set of the sequentially adjacent tracks 600. By way of example, and not of limitation, in one embodiment of pattern 1200A a frequency segment (F1) on track 601 may be 1.5 mm long, while an erasure segment is 0.5 mm long. Differences between erasure segment length enables timing-based discrimination between adjacent tracks of tracks 600. It is appreciated that, in other embodiments, other segment lengths can be employed in a pattern 1200A.

Figure 12B:
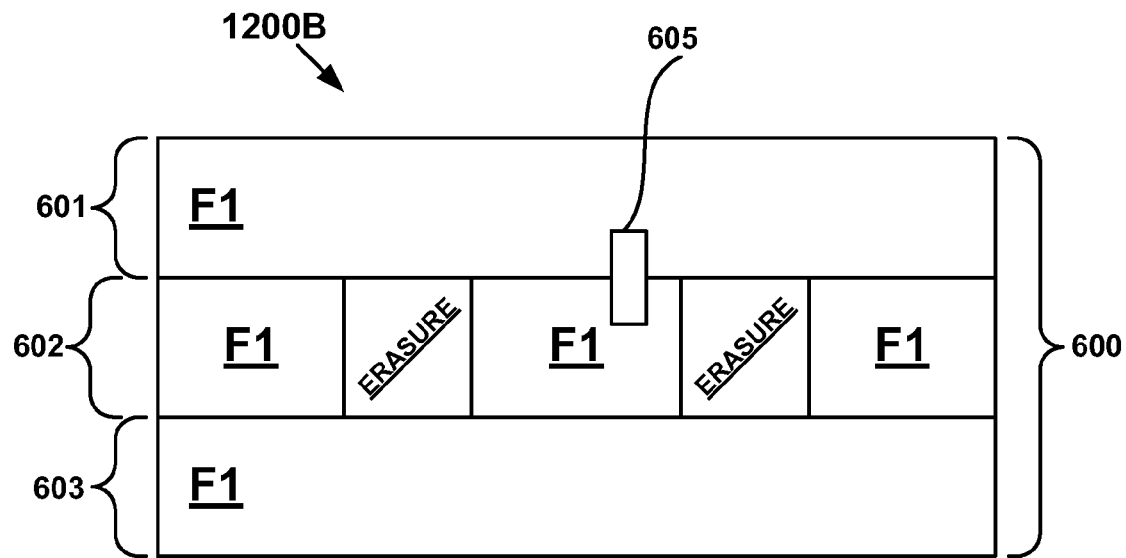
FIG. 12B illustrates another example of an alternating written pattern of signal tones and erasures on a tape, in accordance with an embodiment.

FIG. 12B illustrates an example of an alternating written pattern 1200B of signal tones and erasures on a tape, in accordance with an embodiment. Like numbers refer to like elements in FIGS. 12A and 12B. Pattern 1200B is one example of an alterative to pattern 1200A. Patterns 1200A and 1200B are similar in that they utilize only one frequency tone (F1 in this example). They different in that in pattern 1200B, only one track (602) has the alternating F1 and erasure sections, its adjacent tracks (601, 603) have just F1 along the tape length. In this way, there is no need to align sections to form checkerboard patterns.

At 1030 of flow diagram 1000, in one embodiment, the method measures signal amplitude information while reading a track of the plurality of sequentially adjacent tracks with a read head of a tape drive. The read head can be in the same head 130 in the same tape drive as the write head which wrote the tracks, or can be a read head in a different tape drive from the tape drive which wrote the tracks. The track being read comprises an interior track of the plurality of sequentially adjacent tracks which is surrounded by other tracks of the plurality of sequentially adjacent tracks. For example, with reference to FIGS. 11 and 12, in one embodiment, this comprises signal amplitude measurement unit 420 directing reader 605 to read track 602 of tracks 600. Signal amplitude information is measured from the tone written on track 602. Depending on the offset of reader 605 signal amplitude information for the tone recorded on track 601 or 603 may additionally be measured when reader 605 is offset over a portion of either track 601 or track 603 while reading track 602. The signal from track 602 in the presence of signal from tracks 601/602 can be isolated using temporal or frequency filters.

At 1040 of flow diagram 1000, in one embodiment, the method builds a signal amplitude profile of the track from a set of signal amplitude information accumulated by reading the track at a plurality of offsets of read head 605 relative to the track being read. The plurality of offsets can take place during one reading of the track or during a plurality of readings of the track. The set of signal amplitude information is accumulated by reading of the track at a plurality of offsets of read head 605 relative to the track being read (e.g., track 602 from the above examples). In one embodiment, for example, signal amplitude measurement unit 420 directs that this track is read a plurality of times with each reading occurring at one of a plurality of different offsets of reader 605 with respect to the track. The number of times which constitutes the plurality of readings can vary and is governed by the number of readings desired to produce a level of confidence in the signal amplitude information set. Thus, the plurality of readings could comprise 5 readings, 51 readings, or 1001 readings, or some other number. In one embodiment, a ratio of the signal amplitude of a frequency tone on track 602 versus the signal amplitude of a frequency tone on track 601 and/or 602 is calculated during each of the plurality of readings. In one embodiment, signal amplitude measurement unit 420 directs that this track is read only once but with a plurality of different offsets of reader 605 with respect to the track while the tape moves. In one embodiment, a ratio of the signal amplitude of a frequency tone on track 602 versus the signal amplitude of a frequency tone on track 601 and/or 602 is calculated during each of the plurality of offsets.

Figure 13:
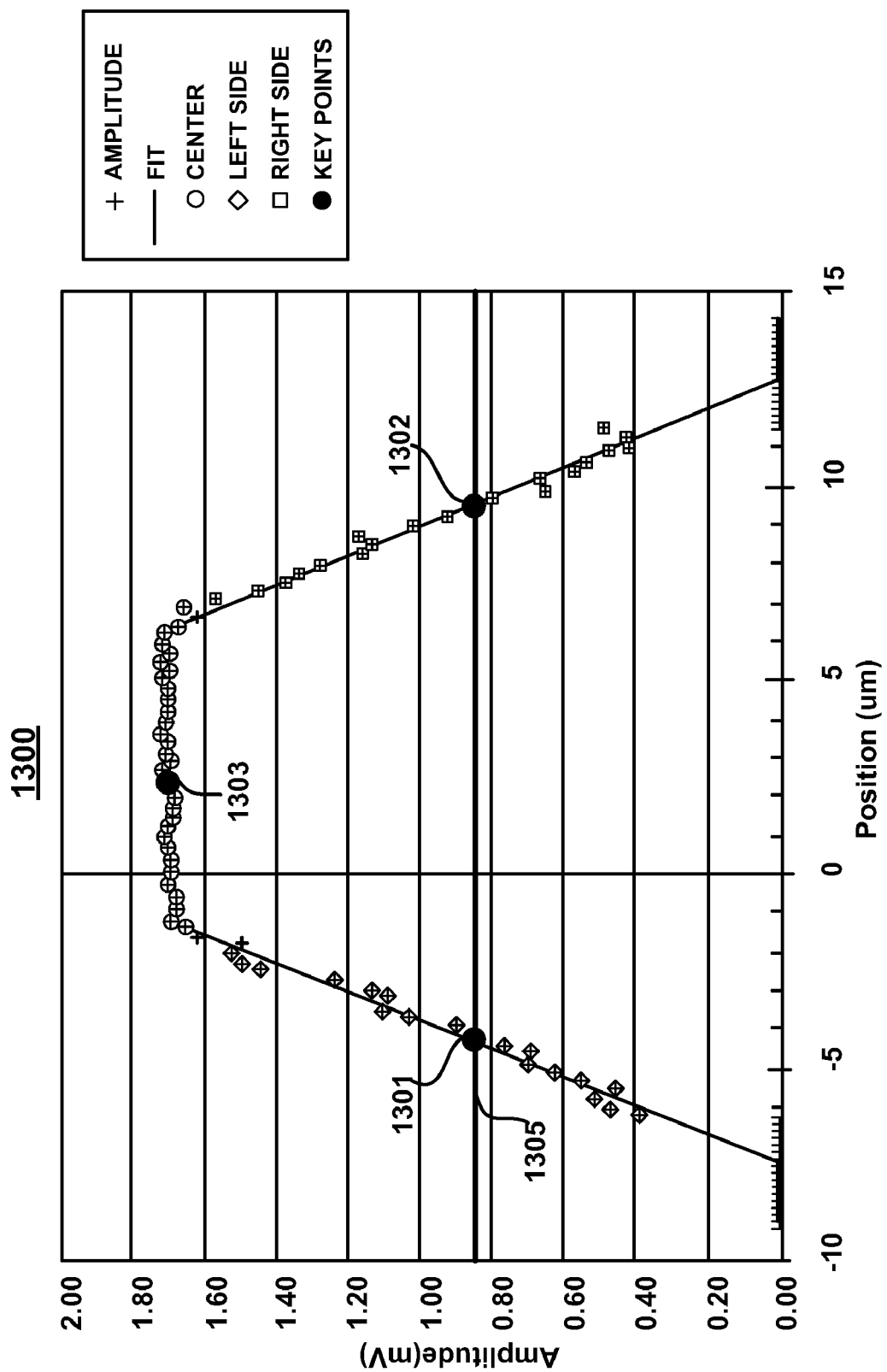
FIG. 13 is a graph illustrating example data of a signal amplitude profile used for measuring reader/writer offset, in accordance with an embodiment.

With reference again to FIG. 11, in one embodiment, the first and second tracks (601 and 603) are written with a first frequency (F1) tone and the second track 602 is written with a second frequency (F2) tone. A ratio of the amplitudes of the different frequencies is obtained by filtering the signals through bandpass filters 1121 and 1122 respectively. By determining the amplitude ratio of F1 and F2 tones read by the reader, a signal amplitude profile 1130 is built which correlates the changes in the signal amplitude ratio with read head offset as indicated by the PES captured from track 602. In one embodiment, the curve of the signal amplitude 1130 is used to determine reader/writer offset in a manner similar to the C1 bathtub curve approach disclosed herein. Signal amplitude profile 1300 of FIG. 13 shows a more detailed example of a signal amplitude profile.

With reference again to FIG. 12A, in one embodiment, a pattern 1200A of signal tones comprising on a single frequency tone (e.g. frequency F1) is written to data tracks 600. The signal amplitude ratio is calculated in a similar fashion to that previously described except that that timing may be utilized to determine whether the tone is being read from track 602 or from tracks 601/603. For each of a plurality of readings of track 602, a ratio is calculated of the average signal amplitude of the frequency tone read from track 602 versus the average signal amplitude of the frequency tone read from track 601 or 603. A signal amplitude profile similar to signal amplitude profile 1300 is built based upon signal amplitude information collected during a plurality of readings at a plurality of offsets of read head 605 relative to track 602.

In one embodiment, while reading and measuring the signal amplitudes in 1030 and 1040 of the method of flow diagram 1000, a plurality of serial variables are captured. In an embodiment, the captured serial variables include one or more of: a top position error signal value (PES_top) and a bottom position error signal value (PES_bottom) for each offset position of a reader; a position error signal azimuth (PES_azi); a time band identification (Time_bandID); and a time for the tape to spool 100 μm past the read head (Time_100 μm). Several of these variables are also captured during writing of the tracks and/or conditioning of the tape, and are or can be used for comparative purposes to determine changes in the tape during reading and writing. In one embodiment, captured serial variables are saved in a memory or a computer data file. As previously described in conjunction with the method of flow diagram 500, such serial variables can be utilized, in some embodiments, to correct for tape skew and/or tape dimensional change (expansion/contraction) that occur during/between the writing and reading of the tracks.

At 1050 of flow diagram 1000, in one embodiment, the method measures offset of the read head relative to the write head by determining an offset of the read head which correlates to a magnetic center of the track as represented by a center point between edges of the signal amplitude profile. For example, in one embodiment, signal amplitude measurement unit 420 accomplishes this by determining an offset of the read head which correlates to a magnetic center of the data track as represented by a center point between edges of the inverted bathtub shaped curve of the signal amplitude profile built from a set of signal amplitude information.

In one embodiment, signal amplitude measurement unit 420 provides the measured offset to calibration unit 430 so that the measured offset can be calibrated out of one or more read/write channels or otherwise reduced or improved upon. This can comprise storing the measured offset in a memory, such as an electrically erasable programmable read only memory (EEPROM) of a tape drive (e.g., tape drive 100). Fore example, this EEPROM or memory can be included in calibration unit 430 so that the offset can be calibrated out, or corrected for during operation of tape drive 100.

With reference to signal amplitude profile 1300 of FIG. 13, in one embodiment a position 1303 in the center of signal amplitude profile 1300 is chosen between two points (1301, 1302) that are established at line 1305 approximately 50% of the way between the maximum and minimum measured signal amplitudes in the profile. As evident from signal amplitude profile 1300, in one embodiment, this indicates a read head offset of approximately +0.25 μm for the read head represented by signal amplitude profile 1300. In other embodiments, the center of the profile can be determined in other manners or through the pre-selection of a greater or lesser signal amplitude percentage than the midpoints illustrated by points 1301 and 1302. It is appreciated that, in one embodiment, signal amplitude measurement unit 420 also computes the width of a read track, such as track 602, by determining the span in position between points 1301 and 1302 in signal amplitude profile 1300. In one embodiment, signal amplitude measurement unit 420 provides the measured offset to calibration unit 430 so that the measured offset can be calibrated out of one or more read/write channels or otherwise reduced or improved upon.

Figure 14:
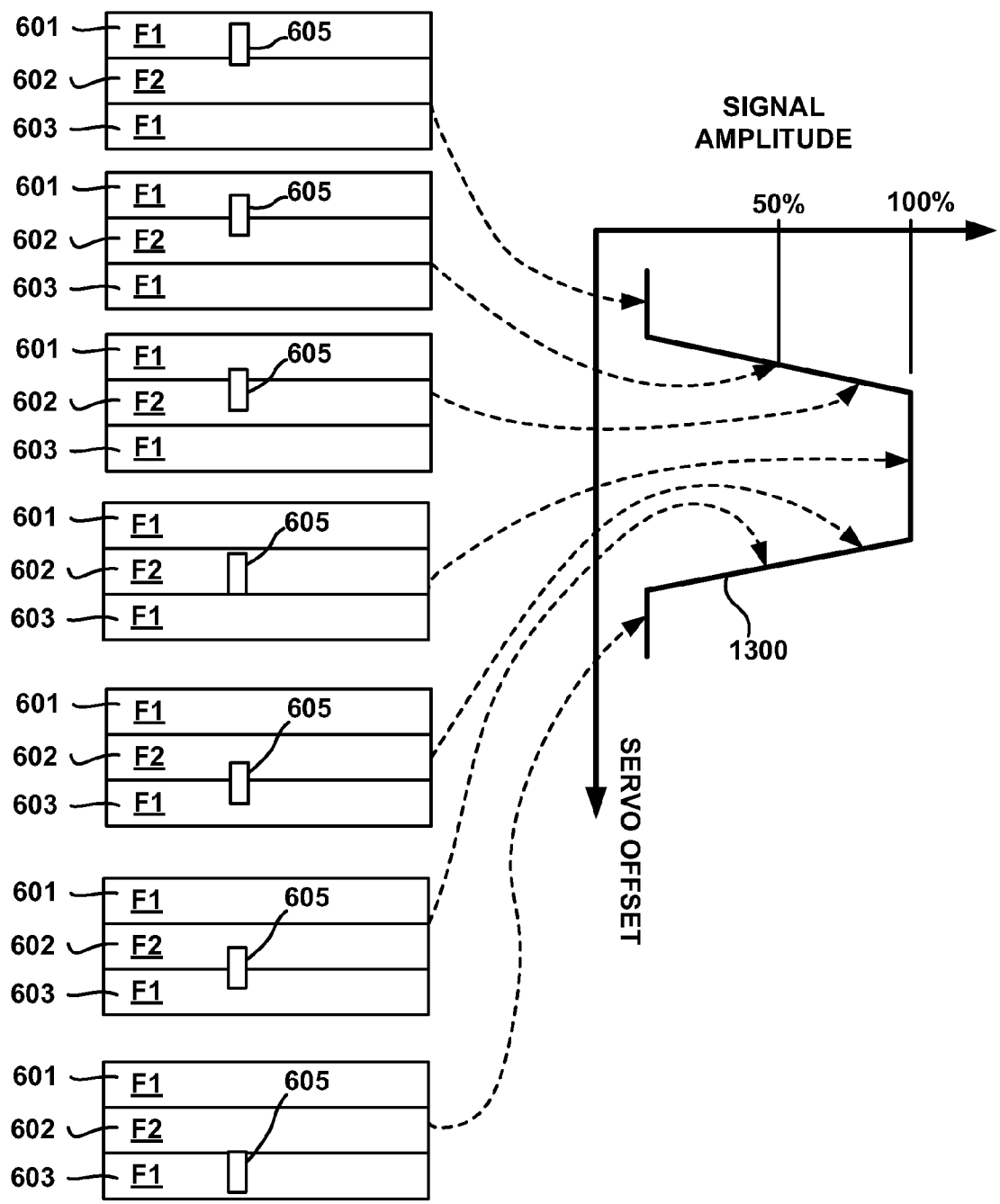
FIG. 14 illustrates key points on an example signal amplitude profile in relation to offsets of a reader with respect to a track when measuring signal amplitude information while reading the track at a plurality of read head offsets, in accordance with an embodiment. These offsets can take place during a single read of the track or during a plurality of reads of the track.

FIG. 14 illustrates key points on signal amplitude profile 1300, of one embodiment, in relation to offsets of reader 605 with respect to tracks 602 when measuring signal amplitude information from a pattern of signal tones recorded on tracks 601, 602, and 603 while performing a plurality of readings of track 602 at a plurality of reader offsets.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of electronically measuring reader/writer offsets in a tape drive head, said method comprising:
   writing a plurality of sequentially adjacent data tracks on a tape with a write head;
   measuring error rate information while reading a data track of said plurality of sequentially adjacent data tracks with a read head of a tape drive, wherein said data track comprises an interior data track of said plurality of sequentially adjacent data tracks which is surrounded by other data tracks of said plurality of sequentially adjacent data tracks;
   building a bathtub shaped curve from a set of said error rate information accumulated by reading said data track at a plurality of offsets of said read head relative to said data track;
   and
   measuring offset of said read head relative to said write head by determining an offset of said read head which correlates to a magnetic center of said data track as represented by a center point between edges of said bathtub shaped curve, wherein said measuring error rate information while reading a data track of said plurality of sequentially adjacent data tracks with a read head of a tape drive further comprises:
   capturing serial variables including a top position error signal value and a bottom position error signal value for each offset position while performing said reading.

2. The method as recited in claim 1, further comprising:
   correcting for said measured offset during operation of said tape drive.

3. The method as recited in claim 1, further comprising:
   conditioning said tape prior to writing said plurality of sequentially adjacent data tracks.

4. The method as recited in claim 1, wherein said writing a plurality of sequentially adjacent data tracks comprises:
   writing a plurality of sequentially adjacent forward tracks.

5. The method as recited in claim 1, wherein said measuring error rate information while reading a data track of said plurality of sequentially adjacent data tracks with a read head of a tape drive comprises:
   measuring a data error rate.

6. The method as recited in claim 1, further comprising:
   capturing serial variables further including a position error signal azimuth value during said reading.

7. A method of electronically measuring reader/writer offsets in a tape drive head, said method comprising:
   writing a plurality of sequentially adjacent data tracks on a tape with a write head;
   measuring error rate information while reading a data track of said plurality of sequentially adjacent data tracks with a read head of a tape drive, wherein said data track comprises an interior data track of said plurality of sequentially adjacent data tracks which is surrounded by other data tracks of said plurality of sequentially adjacent data tracks;
   building a bathtub shaped curve from a set of said error rate information accumulated by reading said data track at a plurality of offsets of said read head relative to said data track;
   and
   measuring offset of said read head relative to said write head by determining an offset of said read head which correlates to a magnetic center of said data track as represented by a center point between edges of said bathtub shaped curve, wherein said building a bathtub shaped curve from a set of said error rate information accumulated during a plurality of readings of said data track at a plurality of offsets of said read head relative to said data track further comprises:
   correcting measured error rate data for measured tape dimensional change.

8. The method as recited in claim 7, further comprising:
   correcting for said measured offset during operation of said tape drive.

9. The method as recited in claim 7, further comprising:
   conditioning said tape prior to writing said plurality of sequentially adjacent data tracks.

10. The method as recited in claim 7, wherein said writing a plurality of sequentially adjacent data tracks comprises:
    writing a plurality of sequentially adjacent forward tracks.

11. The method as recited in claim 7, wherein said measuring error rate information while reading a data track of said plurality of sequentially adjacent data tracks with a read head of a tape drive comprises:
    measuring a data error rate.

12. A method of electronically measuring reader/writer offsets in a tape drive head, said method comprising:
    writing a plurality of sequentially adjacent data tracks on a tape with a write head;
    measuring error rate information while reading a data track of said plurality of sequentially adjacent data tracks with a read head of a tape drive, wherein said data track comprises an interior data track of said plurality of sequentially adjacent data tracks which is surrounded by other data tracks of said plurality of sequentially adjacent data tracks;
    building a bathtub shaped curve from a set of said error rate information accumulated by reading said data track at a plurality of offsets of said read head relative to said data track;
    and
    measuring offset of said read head relative to said write head by determining an offset of said read head which correlates to a magnetic center of said data track as represented by a center point between edges of said bathtub shaped curve, wherein said building a bathtub shaped curve from a set of said error rate information accumulated during a plurality of readings of said data track at a plurality of offsets of said read head relative to said data track further comprises:

correcting measured error rate data for measured tape skew.

13. The method as recited in claim 12, further comprising:
correcting for said measured offset during operation of said tape drive.

14. The method as recited in claim 12, further comprising:
conditioning said tape prior to writing said plurality of sequentially adjacent data tracks.

15. The method as recited in claim 12, wherein said writing a plurality of sequentially adjacent data tracks comprises:
writing a plurality of sequentially adjacent forward tracks.

16. The method as recited in claim 12, wherein said measuring error rate information while reading a data track of said plurality of sequentially adjacent data tracks with a read head of a tape drive comprises:
measuring a data error rate.

17. A tape drive comprising:
a head; and
an offset measurement module for electronically measuring read/write offset of said head, the offset measurement module being communicatively coupled with said head and configured to:
write a plurality of sequentially adjacent data tracks on a tape with a write head;
measure error rate information while reading a data track of said plurality of sequentially adjacent data tracks with a read head of a tape drive, wherein said data track comprises an interior data track of said plurality of sequentially adjacent data tracks which is surrounded by other data tracks of said plurality of sequentially adjacent data tracks;
build a bathtub shaped curve from a set of said error rate information accumulated by reading said data track at a plurality of offsets of said read head relative to said data track;
and
measure offset of said read head relative to said write head by determining an offset of said read head which correlates to a magnetic center of said data track as represented by a center point between edges of said bathtub shaped curve, wherein to measure error rate information while reading a data track of said plurality of sequentially adjacent data tracks with a read head of a tape drive, the offset measurement module is further configured to:
capture serial variables including a top position error signal value and a bottom position error signal value for each offset position while performing said reading.

18. The tape drive of claim 17 wherein said offset measurement module further comprises:
an error rate measurement unit for measuring error rates corresponding to data read at a plurality read head offsets relative to a read data track.

19. The tape drive of claim 17 wherein said offset measurement module further comprises:
a calibration unit for correcting an offset between read and write positions of said head based upon said measured read/write offset.

20. The tape drive of claim 17 wherein to write a plurality of sequentially adjacent data tracks with a write head, said offset measurement module is further configured to:
write a plurality of sequentially adjacent forward tracks with a write head.

21. The tape drive of claim 17, wherein to measure error rate information while reading a data track of said plurality of sequentially adjacent data tracks with a read head of a tape drive, said offset measurement module is further configured to:
measure a data error rate.

22. The tape drive of claim 17 wherein said offset measurement module being further configured to:
capture serial variables further including a position error signal azimuth value during said reading.

23. A tape drive comprising:
a head; and
an offset measurement module for electronically measuring read/write offset of said head, the offset measurement module being communicatively coupled with said head and configured to:
write a plurality of sequentially adjacent data tracks on a tape with a write head;
measure error rate information while reading a data track of said plurality of sequentially adjacent data tracks with a read head of a tape drive, wherein said data track comprises an interior data track of said plurality of sequentially adjacent data tracks which is surrounded by other data tracks of said plurality of sequentially adjacent data tracks;
build a bathtub shaped curve from a set of said error rate information accumulated by reading said data track at a plurality of offsets of said read head relative to said data track;
and
measure offset of said read head relative to said write head by determining an offset of said read head which correlates to a magnetic center of said data track as represented by a center point between edges of said bathtub shaped curve, wherein to build a bathtub shaped curve from a set of said error rate information accumulated during a plurality of readings of said data track at a plurality of offsets of said read head relative to said data track, the offset measurement module is further configured to:
correct measured error rate data for measured tape dimensional change.

24. The tape drive of claim 23 wherein said offset measurement module further comprises:
an error rate measurement unit for measuring error rates corresponding to data read at a plurality read head offsets relative to a read data track.

25. The tape drive of claim 23 wherein said offset measurement module further comprises:
a calibration unit for correcting an offset between read and write positions of said head based upon said measured read/write offset.

26. The tape drive of claim 23 wherein to write a plurality of sequentially adjacent data tracks with a write head, said offset measurement module is further configured to:
write a plurality of sequentially adjacent forward tracks with a write head.

27. The tape drive of claim 23, wherein to measure error rate information while reading a data track of said plurality of sequentially adjacent data tracks with a read head of a tape drive, said offset measurement module is further configured to:
measure a data error rate.

28. The tape drive of claim 23 wherein said offset measurement module being further configured to:
capture serial variables further including a position error signal azimuth value during said reading.

* * * * *